United States Patent [19]

Cheng

[11] Patent Number: 4,861,352

[45] Date of Patent: Aug. 29, 1989

[54] METHOD OF SEPARATING A GAS AND/OR PARTICULATE MATTER FROM A LIQUID

[75] Inventor: Alan T. Cheng, Flushing, N.Y.

[73] Assignee: Union Carbide Corporation, Danbury, Conn.

[21] Appl. No.: 139,462

[22] Filed: Dec. 30, 1987

[51] Int. Cl.$^4$ .............................................. B01D 19/00
[52] U.S. Cl. .......................................... 55/53; 55/196; 75/68 R
[58] Field of Search ........................... 55/53, 36, 196; 75/68 R

[56] References Cited

U.S. PATENT DOCUMENTS

| | | | |
|---|---|---|---|
| 1,255,018 | 1/1918 | Jones | 55/36 |
| 2,413,102 | 12/1946 | Ebert et al. | 18/54 |
| 3,132,013 | 9/1960 | Kumamoto et al. | 55/53 |
| 3,398,507 | 8/1968 | Balogh et al. | 55/15 |
| 3,732,668 | 5/1973 | Nichols | 55/160 |
| 3,778,038 | 12/1973 | Eversole et al. | 261/50 |
| 4,017,276 | 4/1977 | Bloem | 55/51 |
| 4,259,360 | 3/1981 | Venetucci et al. | 426/231 |
| 4,352,682 | 10/1982 | Kemp, Jr. et al. | 55/165 |
| 4,612,021 | 9/1986 | Bland et al. | 55/53 |
| 4,639,340 | 1/1987 | Garrett | 261/36.1 |
| 4,743,405 | 5/1988 | Durao et al. | 261/76 |

FOREIGN PATENT DOCUMENTS

| | | | |
|---|---|---|---|
| 2570286 | 3/1986 | France | 55/53 |
| 56-121681 | 9/1981 | Japan . | |
| 58-133885 | 8/1983 | Japan . | |
| 59-154109 | 9/1984 | Japan . | |
| 60-183012 | 9/1985 | Japan . | |
| 1156417 | 6/1969 | United Kingdom . | |
| 1531537 | 9/1978 | United Kingdom . | |
| 2127711 | 4/1984 | United Kingdom . | |

OTHER PUBLICATIONS

J. Hogan et al., Proceedings of the 17th Congress of European Brewing Corporation, pp. 245-258, 1979.
A. Beevers, Process Engineering of London, vol. 66, No. 8, p. 41, Aug., 1985.
Susan Werner Kieffer, "Sound Speed in Liquid-Gas Mixtures: Water-Air and Water-Steam" Journal of Geophysical Research, vol. 82, No. 20, pp. 2895-2904, Jul. 10, 1977.
D. J. Picard and P. R. Bishnol, Int. J. Multiphase Flow, vol. 13, No. 3, pp. 295-308, 1987.

Primary Examiner—Bernard Nozick
Attorney, Agent, or Firm—Shirley L. Church; Alvin H. Fritschler

[57] ABSTRACT

The present invention relates to a method and apparatus for separating a gas vapor or particulate matter or combinations thereof from a liquid.

The liquid is contacted with a stripping gas or vapor which is immiscible in or which has low solubility in the liquid under operating conditions, which stripping gas or vapor is different from the gas or vapor to be separated from the liquid. The contact is achieved in an in-line stripping device which is capable of accelerating at least a portion of the stripping gas or vapor/liquid composition to a linear velocity which is supersonic for the composition.

25 Claims, 15 Drawing Sheets

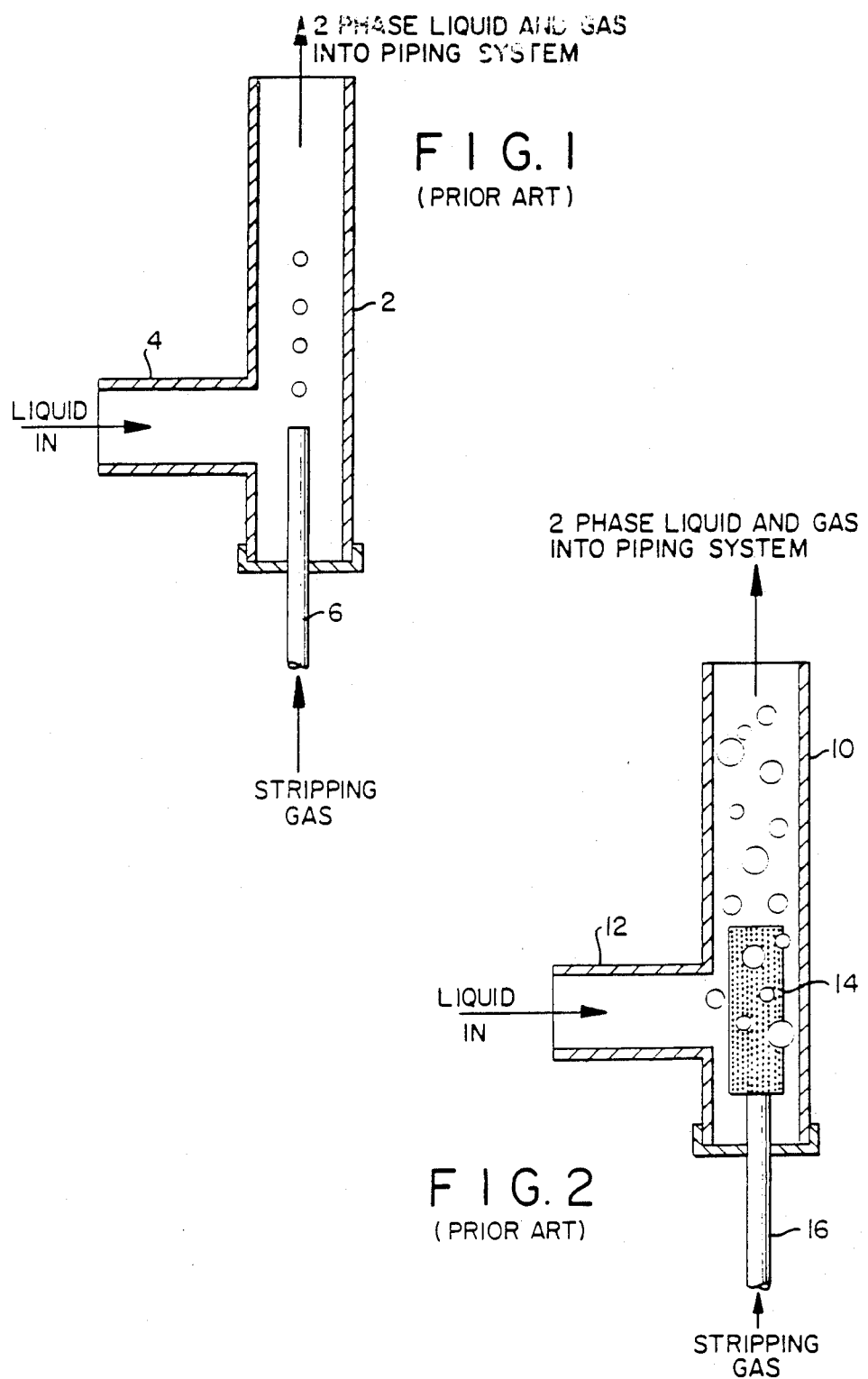

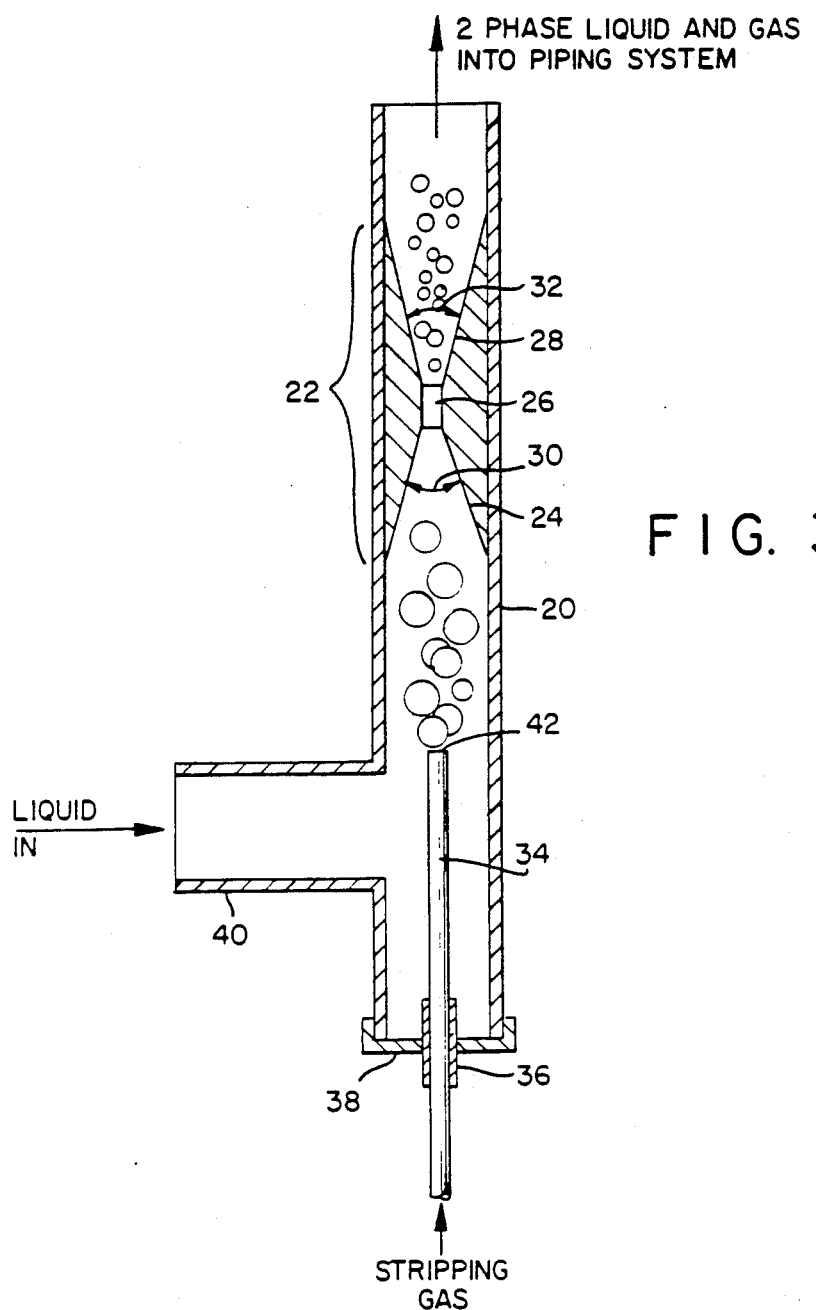

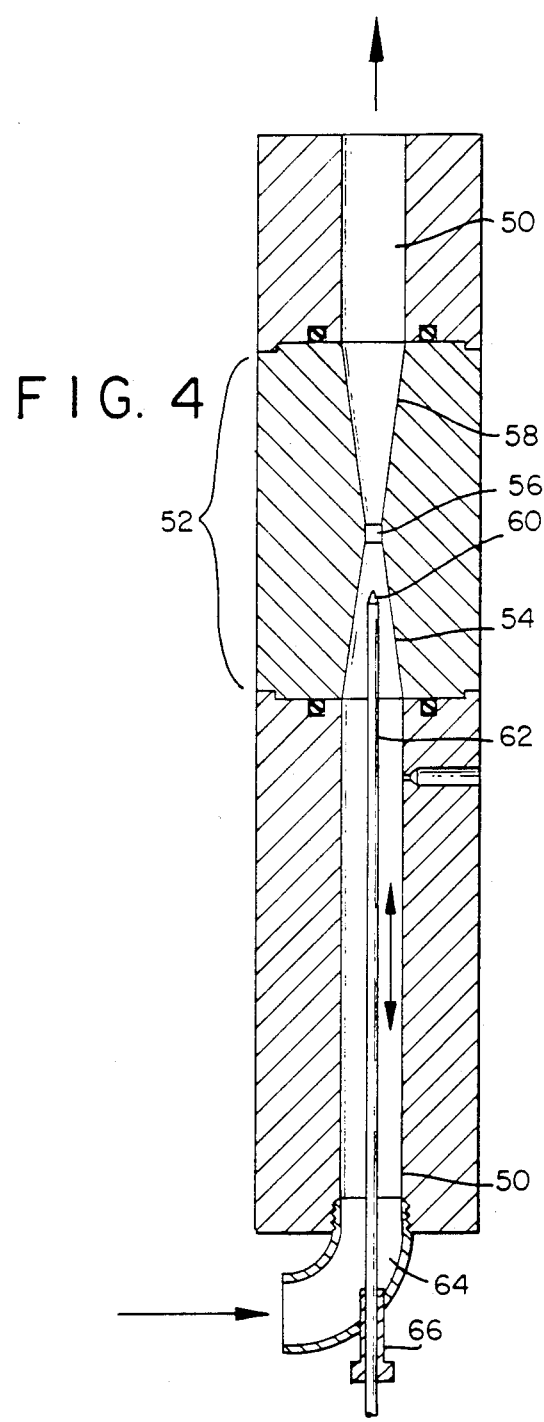

METHOD OF SEPARATING A GAS AND/OR PARTICULATE MATTER FROM A LIQUID

BACKGROUND OF THE INVENTION

1. Field of the Invention

The present invention relates to a method and apparatus for separating a higher vapor pressure component and/or particulate matter from a lower vapor pressure component in a fluid mixture. For example, a method and apparatus for separating a gas from a liquid. The functional portion of the apparatus is fitted to the inside of a pipeline so the separation can be made while the mixture is traveling through a pipeline. The method comprises contacting the mixture with an immiscible or low solubility stripping substance different from the high vapor pressure component and/or the particulate matter to be removed from the mixture. The higher vapor pressure component is extracted from the lower vapor pressure component of the mixture into the stripping substance. Any particulate matter removed must adhere either to the higher vapor pressure component or to the stripping substance. The stripping substance is then separated from the mixture, reducing the amount of high vapor pressure component and/or particulate matter in the mixture.

2. Background of the Invention

The removal of gas dissolved or held in suspension in a liquid by contacting the liquid with a stripping gas is known in the art. The requirement for removal of the dissolved gas is that the partial pressure of the dissolved gas in the stripping gas be lower than the partial pressure of the dissolved gas in the liquid, thus permitting mass transfer of the dissolved gas from the liquid into the stripping gas. The rate of removal of the dissolved gas from the liquid is controlled by the rate of diffusion of the dissolved gas from the liquid into the stripping gas phase. The dissolved gas in the liquid reaches equilibrium with the dissolved gas in the stripping gas in time, after which no additional dissolved gas diffuses from the liquid. The conditions for equilibrium may be described by Henry's Law. A good description of typical equilibrium phenomenon and of the kinds of parameters involved was presented in the Proceedings of the 17th Congress of European Brewing Convention, pp. 245–58, 1979, in an article by J. Hoggan et al., entitled "A SIMPLE PRODUCTION SYSTEM FOR THE DEOXYGENATION OF WATER". This article describes a method of removing (stripping) dissolved oxygen from water using nitrogen gas as the stripping gas. United Kingdom Provisional Patent Specification No. 1,156,417 of Harold Davidge and Charles Sydney Gibbs, published June 25, 1969, describes a method of removing dissolved oxygen from liquids by bubbling through the liquid a gas having a lower partial pressure of oxygen than that of the liquid, which gas does not react chemically with the liquid. A sparging device is used to feed the stripping gas, nitrogen, into the liquid. The oxygen removal rate is substantially increased by causing turbulent flow of the liquid stream at a point downstream of the point of introduction of the nitrogen gas. Different devices capable of creating turbulence are described.

U.S. Pat. No. 4,639,340 to Garrett dated Jan. 27, 1987, discloses a method for dissolving gas in a liquid comprising pressurizing a stream of liquid, introducing the gas into the pressurized stream to form a gas-liquid mixture traveling at a velocity less than the velocity of sound in the liquid, accelerating the pressurized mixture stream to a supersonic velocity to create a first shockwave effective to reduce the size of the gas bubbles in the stream, thereby forming a dispersion of the gas under pressure in the liquid, reducing the velocity of the stream below sonic velocity, and transporting the pressurized stream to an outlet near which the velocity of the pressurized stream is accelerated to supersonic velocity once more to create a second shockwave prior to exit of the stream from the outlet.

There are numerous applications for stripping gases out of liquids, one of the most common being stripping oxygen from liquids. Typical examples, not intended to be limiting, follow. In enhanced oil recovery, sea water is injected directly into oil wells. It is necessary to remove dissolved oxygen from the sea water prior to its use to minimize corrosion. The de-oxygenated water typically has less than 0.1 to 1 ppm of dissolved oxygen. In most cases, the oxygen removal is effected by vacuum de-aeration or hydrocarbon stripping. U.S. Pat. No. 4,017,276 to Bloem, dated Apr. 12, 1977, discloses a method of stripping dissolved oxygen from sea water using a nitrogen stripping gas. Sea water is introduced into a stripping tower, and as the result of countercurrent contact between the nitrogen stripping gas and the sea water, oxygen concentrations as low as 7.5 to 12 ppm remain in the sea water after stripping. U.S. Pat. No. 4,612,021 to Palmer, dated Sept. 16, 1986, and United Kingdom Patent Application GB 2127711, dated Apr. 18, 1984, disclose methods of de-oxygenating seawater used in waterflood petroleum recovery. United Kingdom patent GB No. 1531537, issued Nov. 8, 1978, discloses a method of using nitrogen gas to remove dissolved oxygen from sea water. The nitrogen is placed into cocurrent flow with the sea water and then mixed into the sea water using an in-line static mixer; the mixture is subsequently fed into a cyclone separator.

De-oxygenation of boiler feed water has typically been carried out in thermal de-aerators by raising the temperature of the water with steam. A. Beevers, Process Engineering of London, Vol. 66, No. 8, p. 41, August 1985, in an article entitled "Cool Way to De-aerate", reported using nitrogen as a stripping gas to remove oxygen and carbon dioxide from boiler feed water. Japanese Pat. No. JP 60/183012 discloses a method for removing dissolved oxygen in boiler feed water by nitrogen stripping.

Japanese Pat. No. JP 56/121681 discloses a method of removing oxygen from the water in an open cooling system used in a tire plant. The cooling water is sparged with nitrogen at a nitrogen:water ratio of 6:1.

Japanese Pat. No. JP 59/154109 discloses a method of sparging industrial water with nitrogen to reduce the oxygen content of such water to less than 0.1 ppm dissolved oxygen.

Japanese Pat. No. JP 58/133885 describes a method of removing oxygen from process water by sparging with nitrogen at reduced pressure.

U.S. Pat. No. 3,132,013 to Kumamoto et al., dated May 5, 1964, describes a process for treating feed water, including the removal of oxygen from the water using a nitrogen stripping gas.

U.S. Pat. No 3,732,668 to Nichols, dated May 15, 1973, discloses a system to be inserted within aircraft fuel tanks, whereby dissolved oxygen is removed from the fuel.

U.S. Pat. No. 4,352,682 to Kemp, Jr. et al., dated Oct. 5, 1982, describes a de-oxygenating unit for removal of oxygen from water which is to be used to produce carbonated beverages.

U.S. Pat. No. 4,259,360 to Venetucci et al, dated Mar. 31, 1981 describes a method of reducing dissolved oxygen content of foodstuffs and of water used in beverage production by gas sparging with nitrogen.

Most of the art cited above demonstrates the stripping of a first gas from a liquid using a second stripping gas. The objective is to obtain maximum removal of the first gas while minimizing power consumption as well as consumption of the stripping gas. It is also possible to remove particulate contaminants from a liquid using a stripping gas. The particulates may adhere to the stripping gas itself or may adhere to a volatile component within the liquid which is removed from the liquid by the stripping gas.

Stripping gas consumption has been reduced by generation of better mixing between the stripping gas and the liquid. The improved mixing may increase the available surface area of the stripping gas, and improves distribution of the stripping gas throughout the liquid. Either of these actions increases mass transfer of volatile components and/or particulates from the liquid into the stripping gas. However, the increased mixing has been achieved by creating turbulence between the stripping gas and the liquid, by methods such as in-line static mixers and the use of mixing chambers containing insoluble reticulated material through which the stripping gas-liquid mixture must pass. Increased turbulence has been obtained at the cost of increased pressure drop across process lines and mixing chambers, necessitating higher operating pressures, which tend to force the first, dissolved gas back into the liquid and to increase power consumption.

It would be desirable to find a method of increasing the effective surface area of the stripping gas which does not generate significantly increased system operational pressures (with accompanying detriment to separation and increased power consumption costs).

SUMMARY OF THE INVENTION

In accordance with the present invention, at least one higher vapor pressure (volatile) component, or particulate matter, or combinations thereof are separated from a fluid mixture comprising a lower vapor pressure component. Separation is accomplished by contacting the mixture with an immiscible stripping substance or a stripping substance having very low solubility in the fluid mixture, the stripping substance being different from the volatile component or particulate matter, as the case may be. The at least one higher vapor pressure component in the fluid mixture diffuses into the stripping substance to achieve thermodynamic equilibrium and is subsequently separated along with the immiscible, or low solubility stripping substance from the mixture. When particulate matter is removed from the fluid mixture, the particulates must adhere to the stripping substance itself or must adhere to at least one higher vapor pressure, volatile, component which diffuses into the stripping substance.

The method of the present invention is an improvement over previous stripping methods which use similar mass transfer techniques, since it provides a non-mechanical method for the formation of extremely small (smaller than 1 mm and preferably smaller than 0.01 mm) bubbles of the stripping substance within the fluid mixture; The smaller bubbles increase the available stripping substance surface area through which the at least one higher vapor pressure component diffuses from the mixture into the stripping substance. The smaller bubbles also increase the surface area to which particulates can adhere. The preferred method of the present invention requires operation of the separation system at relatively low pressures, facilitating mass transfer of the higher vapor pressure component out of the mixture, and provides reduced pumping power requirements, thus reducing power consumption costs. In addition, the preferred method of the present invention is carried out using means placed within a pipeline through which the mixture flows, providing a relatively simple means for obtaining separation of the at least one higher vapor pressure component and/or particulates to be removed from the mixture. Thus the apparatus and method disclosed herein enable operational cost reductions over previously known technology by providing increased stripping efficiency at reduced stripping substance and power consumption.

The preferred in-line stripping process can be a single stage removal, whereby co-current flow of the stripping substance with the mixture provides the contact time necessary for mass transfer of particulate matter by adherence and/or mass transfer of the at least one higher vapor pressure component through the surface interface into the stripping substance. More than one of the stripping apparati can be placed in series in a pipeline to increase the amount of mass transfer obtained; it is also possible to recycle the mixture through the pipeline containing the stripping apparatus to increase the amount of mass transfer.

The method of the present invention utilizes either feed of the stripping substance into the fluid mixture at a supersonic flow rate for the stripping substance, or supersonic flow of the mixture with stripping substance dispersed therein, or combinations thereof, to generate at least one shockwave which creates extremely small bubbles of the stripping substance within the mixture, thereby increasing dramatically the surface area of stripping substance to provide increased mass transfer interface. The speed of sound in water is about 4,700 to about 4,800 ft/sec. The speed of sound in air is about 1,100 ft/sec. During investigation leading to the present invention, it was discovered that when a gas or vapor entered a fluid mixture at a linear velocity greater than about 1,100 ft/sec, a localized sonic shock wave occurred which shattered the gas or vapor into extremely small bubbles which can be dispersed into the liquid phase.

The presence of gas or vapor bubbles in a liquid dramatically reduces the speed of sound in the mixture or dispersion of gas/vapor liquid. This phenomenon is described by Susan Werner Kieffer, in "Sound Speed in Liquid-Gas Mixtures: Water-Air and Water Steam", Journal of Geophysical Research, Vol. 82, No. 20, pp. 2895–2904, July 10, 1977. Methods of calculation of sound velocity in multicomponent fluids are presented by D. J. Picard and P. R. Bishnol, in "Calculation of the Thermodynamic Sound Velocity in Two Phase Multicomponent Fluids", Int. J. Multiphase Flow, Vol. 13, No. 3, pp. 295–308, 1987. The subject matter of these two references is hereby incorporated by reference.

An example of the above reduction of sound velocity in a gas-vapor/liquid mixture is an air water mixture of about 1:1 by volume; in this mixture, the speed of sound decreases to about 50 ft/sec., depending on temperature and pressure. Thus, when this fluid mixture of air and water travels at a theoretical linear velocity greater than about 50 ft/sec., a sonic shock wave occurs, causing the air to break up into extremely small bubbles within the water. This same principal is used, in the method of the present invention, to generate extremely small bubbles of an immiscible or very low solubility stripping substance within a fluid mixture at relatively low linear flow velocities.

In the method of the present invention, the supersonic flow necessary to create the shockwave is obtained by one of three means: (1) by injecting a stripping substance, at a supersonic speed for the stripping substance at the point of injection, directly into a fluid mixture in a pipeline; (2) by injecting a stripping substance into a fluid mixture so that it enters the liquid at a velocity which is not supersonic for the stripping substance, but wherein the stripping substance passes, in combination with the fluid mixture, directly through an in-line device which increases the linear flow velocity of at least a portion of the mixture-stripping substance combination to a supersonic velocity; (3) by injecting the stripping substance into a fluid mixture in the pipeline at a supersonic speed for the stripping substance, and then causing the resulting combination of stripping substance and fluid mixture to pass through an in-line device wherein the velocity of at least a portion of the combination is supersonic.

It has been discovered, during investigation of the method of the present invention, that localized shockwaves can occur at points across the fluid flow profile at which sonic velocity of the flowing composition is exceeded. Due to the size of in-line stripping device which will be used in some applications, the linear velocity of flow is highest at the centerline of the flow profile, and localized shockwaves occur at this location. Thus, it is possible to benefit from the method of the present invention even though the average linear velocity for the stripping gas-fluid mixture through the in-line stripping device is subsonic.

It is possible to use more than one stripping device in series in a pipeline to increase the separation of the at least one high vapor pressure component and/or any particulate matter from the mixture. During experimentation, it was discovered that typically less than 60 seconds of in-line time is required for thermodynamic equilibrium to occur between the partial pressures of the high vapor pressure component in the stripping substance and in a liquid mixture. Thus, the stripping substance can approach saturation after a single pass through a stripping device. It is, then, typically advisable to permit separation of the stripping substance from the liquid mixture and to introduce a new quantity of stripping substance prior to passing the liquid mixture with stripping substance dispersed therein through a second in-line stripping device.

The liquid mixture from which the high vapor pressure component and/or any particulate matter is to be separated can be recycled through the same in-line stripping device; however, as stated above, it is important to have the stripping substance be capable of accepting the mass transfer of additional higher vapor pressure component, or recycling is not useful.

The mass transfer rate of higher vapor pressure component from a fluid mixture to the stripping substance depends mainly on the following factors: amount of higher vapor pressure component present in the stripping substance and present in the mixture, the amount of surface area between the stripping substance and the mixture through which mass transfer can occur, operating temperature, operating pressure, and residence time of the stripping substance-fluid mixture composition in the pipeline. The volumetric flow rate of the composition in a given pipeline determines the linear velocity of the composition flowing through the in-line stripping device, as well as the residence time of the composition in the pipeline prior to separation of the immiscible stripping substance from the fluid mixture. The linear velocity of the composition, at some point in the in-line stripping device, must be at least the minimum necessary to generate supersonic flow within at least a portion of the composition.

The in-line device used to increase the linear flow velocity of the fluid mixture-stripping substance composition can be any device which provides an accelerating pattern of flow sufficient to produce supersonic velocity of at least a portion of the composition. However, the size of bubbles obtained for a given liquid/volatile component/stripping substance composition (and thus the mass transfer surface area), the operational pressure required, and the power consumption within the system will depend on the in-line device structural configuration and on the position of injection of stripping substance into the liquid-volatile component mixture or dispersion relative to the flow accelerating device.

The preferred in-line device is a type of venturi configuration comprising at least an incoming compression cone through which a liquid/mixture volatile component/stripping substance composition enters and an expansion cone through which the composition exits. This kind of in-line device is preferred because it facilitates the reduction of pressure drop across the in-line device, reducing the required system operational pressure and the pumping (power) costs for operation of the device.

For a given liquid mixture/high vapor pressure component/stripping substance composition, the stripping operation can be made most efficient by providing a method of obtaining the required residual concentration of dissolved volatile component and/or particulate matter in the liquid mixture while reducing the stripping substance consumption and power consumption to a minimum. The power consumption of the stripping system and the amount of stripping substance required can be reduced by optimizing the structural configuration of the stripping device and by changing process variables, not intended to be limiting, such as in-line residence time and linear velocity through the stripping device via volumetric flow rate, temperature, pressure, relative volume of stripping substance per volume of liquid processed, and initial concentration of volatile component in the stripping substance.

Regarding the stripping device structural configuration, when the stripping device comprises an injection nozzle and a venturi configuration, it has been discovered that the effectiveness of the stripping apparatus is increased by placing the injection nozzle from which the stripping substance enters the liquid mixture closer to the beginning of the venturi throat or closer to the smallest diameter opening in the venturi configuration, whichever is applicable, since the venturi device need not have a significant throat length. However, the system operating pressure and the pumping power required to move the liquid mixture high vapor pressure component stripping substance composition through the pipeline increases as the nozzle is moved closer to the venturi throat or closer to the smallest diameter opening of the venturi configuration. Thus, for each stripping system, there is a nozzle injector position at which the necessary residual concentration of dissolved volatile component in processed liquid is obtained at minimal pumping cost for that venturi configuration.

There are also structural limitations on injector placement. As the compression cone included angle of the venturi configuration becomes smaller, the injector must be placed a greater distance upstream of the venturi throat. As the diameter of the venturi throat becomes smaller, the injector must be placed a greater distance upstream of the venturi throat.

Examples of preferred in-line device configurations follow. The injector position should be at least about 0.1 pipe diameters prior to the beginning of the venturi throat or prior to the smallest diameter opening in the venturi configuration, depending on process variables which will be discussed later herein. The preferred injector position ranges from about 0.2 to about 25 pipe diameters upstream (prior to) of the venturi throat or smallest diameter opening. The most preferred position is within the venturi configuration compression cone. The preferred venturi throat length is the minimum which materials and methods of construction will permit. Although a better mass transfer rate is achieved with a longer venturi throat, pumping power consumption increases rapidly with increasing throat length, so that, in general, overall efficiency (expressed as mass transfer rate divided by fluid mixture pumping power consumption) improves as the length of the venturi throat decreases. The overall efficiency also increases as the venturi throat diameter or smallest diameter opening of the venturi configuration is increased. Again, a better mass transfer rate is achieved using a smaller venturi throat or opening diameter, but pumping power consumption increases, so that a larger diameter opening improves the overall efficiency. However, the venturi opening size must remain such that supersonic flow of the fluid mixture/stripping substance composition is achieved at least at some points across the flow profile of the composition. For throats or openings as small as about 0.15 pipe diameters, the position of the stripping substance injector upstream of the opening is not as critical, but as the opening size increases to about 0.19 pipe diameters or greater, overall efficiency (expressed as mass transfer rate divided by fluid mixture pumping power consumption) improves when the injector is positioned from about 1 to about 2 pipe diameters upstream of the throat or opening. The preferred injector position is within the compression cone of the venturi configuration.

In addition to the above, it has been discovered that injection of the stripping substance into a liquid mixture at a velocity which is supersonic for the stripping substance as it exits the injector provides an improvement in the mass transfer rate over that which can be achieved when the injection velocity of the stripping substance is subsonic. The overall efficiency (expressed as mass transfer rate divided by fluid mixture pumping power consumption) is improved with use of supersonic injection of the stripping substance, since no significant increase in power consumption was observed while mass transfer rate was increased.

The power consumption can be reduced by positioning the stripping substance injector farther upstream of the venturi throat or smallest diameter opening in the venturi configuration. However, it has been discovered that moving the nozzle upstream and away from the entrance to the venturi throat or smallest diameter opening results in the formation of larger bubbles of stripping substance after the sonic shock wave. Thus, one must balance the higher system operating pressure necessary when the injector is closer to the venturi throat with the size of stripping substance bubble formation. As discussed above, there are preferred ranges for the location of the injector relative to the venturi throat or opening.

In addition, the power consumption can be reduced in all cases by reducing the compression cone angle, or the expansion cone angle, or both, of the venturi configuration. The limiting factors are the ability to fabricate a configuration having smaller cone angles, the ability to place the injector near the venturi throat or minimum opening, and amount of piping space in which the in-line stripping device must be installed.

It has been discovered, in general, that to obtain a specific fractional reduction of the at least one volatile component in the liquid mixture, given a limited in-line residence time, it is necessary to increase the volume of stripping substance per volume of mixture as the venturi opening size increases (all other variables held constant).

It has also been discovered, in general, that for a given venturi opening size, once the average linear velocity of the fluid mixture stripping substance composition reaches theoretical supersonic velocity through the in-line stripping device, there is little advantage, in terms of fractional reduction, to using an increased composition linear velocity. Typically, the volume of stripping substance required per volume of mixture remains relatively constant, so long as the extremely small bubbles of stripping substance are formed and total residence time of the composition in the pipeline (in and subsequent to the in-line device) is adequate.

It has also been discovered that for a specific volumetric ratio of stripping substance to fluid mixture, the stripping efficiency, measured as mass transfer coefficient divided by processing power requirements (pumping horsepower requirements), can be optimized by controlling stripping substance nozzle position relative to the smallest diameter of the venturi opening, so the size of the stripping bubbles produced (smaller bubbles provide increased volatile component mass transfer) is balanced against pumping costs.

Thus, in general, to optimize the stripping apparatus for a given stripping application, one must provide the lowest total cost for stripping substance consumption and pumping power. One does this by pumping a given liquid mixture-stripping substance composition at the lowest linear velocity which will provide supersonic flow and create the necessary shock wave. For a given liquid mixture throughput rate, one initially sizes the smallest diameter portion of the venturi opening as large as possible, to provide the lowest system pressure at which the supersonic velocity occurs. This provides the lowest pumping costs and assists separation of the volatile component from the liquid mixture. The stripping substance consumption will typically be high under these conditions. One then selects an injector which has the smallest outside diameter acceptable in terms of operational pressure for stripping substance feed. This provides the least restriction to flow of the fluid mixture through the in-line device. One then decreases the smallest diameter portion of the venturi opening within limits the injector size will permit, simultaneously decreasing the volumetric flow rate of stripping substance, until total costs for power and stripping substance consumption to produce the desired processed mixture composition are minimized. Again, within the limitations required for injection of the stripping substance, the smaller the included angle of the compression cone and the smaller the included angle of the expansion cone of the venturi device, the lower the pressure drop across the device in general.

Process variables can also be adjusted to improve the separation achieved while reducing operational costs. Again, offsetting factors must be balanced. As pointed out previously, it is desired to maintain operational pressure as low as possible. The time required to closely approach thermodynamic equilibrium of the volatile component between stripping substance and mixture varies from a fraction of a second to a few minutes depending on the fluid mixture characteristics, thus, the flow rate of the combined composition through the stripping device and subsequent piping, prior to separation of the stripping substance from the mixture, should provide the necessary few seconds residence time. The operating temperature must be balanced between product stability and stripping efficiency factors. Typically increased temperature results in a decrease in mixture viscosity, which is an advantage in reduced pumping pressure requirements. In addition, it has been discovered that, typically, although solubility of the volatile component of the mixture increases with increasing temperature, the increase in diffusion rate of the volatile component from the mixture into the stripping substance more than compensates for the solubility increase. The operating temperature can be increased as high as slightly below the boiling point of the low vapor pressure component of the mixture at the system operating pressure.

For purposes of the specification and claims provided herein, the following terms are intended to have the following provided meanings.

Fluid mixture means one or more substances in combination wherein the combined composition is fluid at system operating conditions. The fluid mixture can comprise miscible and/or immiscible components. The fluid mixture can be a solution, suspension, or a dispersion of liquid droplets or suspended solids as in a slurry.

Lower vapor pressure component means an individual substance or combination of substances each having a vapor pressure less than that of the higher vapor pressure component to be stripped from the mixture.

Higher vapor pressure or volatile component means an individual substance or combination of substances each having a vapor pressure greater than the lower vapor pressure component from which the higher vapor pressure component is to be separated.

Stripping substance means any substance which is immiscible with or has very low solubility in the fluid mixture under the operating conditions, such as temperature and pressure, of the system. Typically, the stripping substance should not react with at least the lower vapor pressure component of the fluid mixture.

Dissolved component means there is no distinctive phase between this component and the fluid mixture.

Extremely small bubbles means bubbles having a diameter less than about 0.1 mm.

Immiscible means there is a distinctive phase separation which occurs upon mixing.

$$\frac{(C_{in} - C_{out})}{C_{in}}$$

wherein $C_{in}$ is the initial concentration of a component upstream of the in-line stripping device, and $C_{out}$ is the concentration of the component at a location immediately following or downstream of the in-line stripping device. In the present specification if $C_{out}$ is determined other than immediately following the in-line stripping device, the downstream location at which $C_{out}$ was measured is specified.

Included angle means the angle between the internal walls of the venturi cone configuration.

This application is being filed simultaneously in the United States of America with a related patent application regarding the use of a similar in-line device to dissolve a volatile component in a liquid. The related application is entitled "Improved Gas Dispersion Process and System", by K. Kiyonaga et al. Ser. No. 139,573, filed Dec. 30, 1987, and the subject matter thereof is hereby incorporated by reference.

DESCRIPTION OF THE DRAWINGS

FIG. 1 shows a typical tee type gas liquid mixing device of the kind known in the art. Gas is fed into a tube, the end of which is placed in a tee in the pipe through which the liquid flows.

FIG. 2 shows a typical sparger type gas gas-liquid mixing device of the kind known in the art. Gas is fed into a porous metal diffuser which is placed in a tee in the pipe through which the liquid flows.

FIG. 3 illustrates a preferred in-line laboratory-sized stripping device of the present invention, which combines an open tube through which stripping substance is fed into a liquid mixture or dispersion flowing in a pipeline with a venturi configuration which is used to accelerate the linear velocity of the liquid mixture stripping substance composition to a supersonic velocity.

FIG. 4 depicts an in-line laboratory sized stripping device which combines a nozzle through which the stripping substance is fed (at a subsonic or supersonic velocity) into a fluid mixture, with a venturi configuration which is used to accelerate the linear velocity of the fluid mixture stripping substance composition to a supersonic velocity.

FIG. 4a depicts the nozzle utilized in the venturi stripping device.

DESCRIPTION OF THE PREFERRED EMBODIMENTS

The present invention provides a method and apparatus for stripping at least one volatile, high vapor pressure component from a fluid mixture comprising a lower vapor pressure component. Particulate matter can also be removed from the fluid mixture by the method of the present invention. Several different mixtures have been processed using varying stripping apparati. All of the stripping apparati of the present invention have been based on the principal of using supersonic flow to provide a shock wave which generates extremely small bubbles (ranging from about 0.01 mm to about 1 mm in diameter) of a stripping substance within the mixture. The supersonic flow can be achieved by injecting the stripping substance at supersonic velocity into the mixture, by causing the mixture-stripping substance composition to flow at supersonic velocity, or by combinations thereof. The small bubbles generated by the shock wave provide surface area for mass transfer of the volatile component from the mixture into the stripping substance. The preferred stripping apparatus comprises an in-line venturi configuration, which enables acceleration of the composition linear velocity to supersonic while maintaining pressure drop within the system as low as possible.

Process variables such as residence time (flow rate or processing rate), temperature, pressure, initial volatile component concentration in the mixture and in the stripping substance, and ratio of stripping substance to mixture have been varied, to determine preferred operating ranges for a given composition comprising a lower vapor pressure component/higher vapor pressure component/stripping substance.

EXAMPLE 1

Oxygen was stripped from water using several different in-line stripping devices: an in-line tee of the type shown in FIG. 1; an in-line sparger of the type shown in FIG. 2; an open tube feed of a stripping substance to a venturi configuration, shown in FIG. 3, and a pressurized nozzle feed of stripping substance to a venturi configuration, shown in FIG. 4. All of the in-line devices were placed in a pipeline having about 500 inches of length downstream of the in-line device, prior to the exit valve. The stripping gas used to strip the oxygen from the water was room temperature nitrogen having an initial oxygen content of about 1 ppm.

Figure 5:
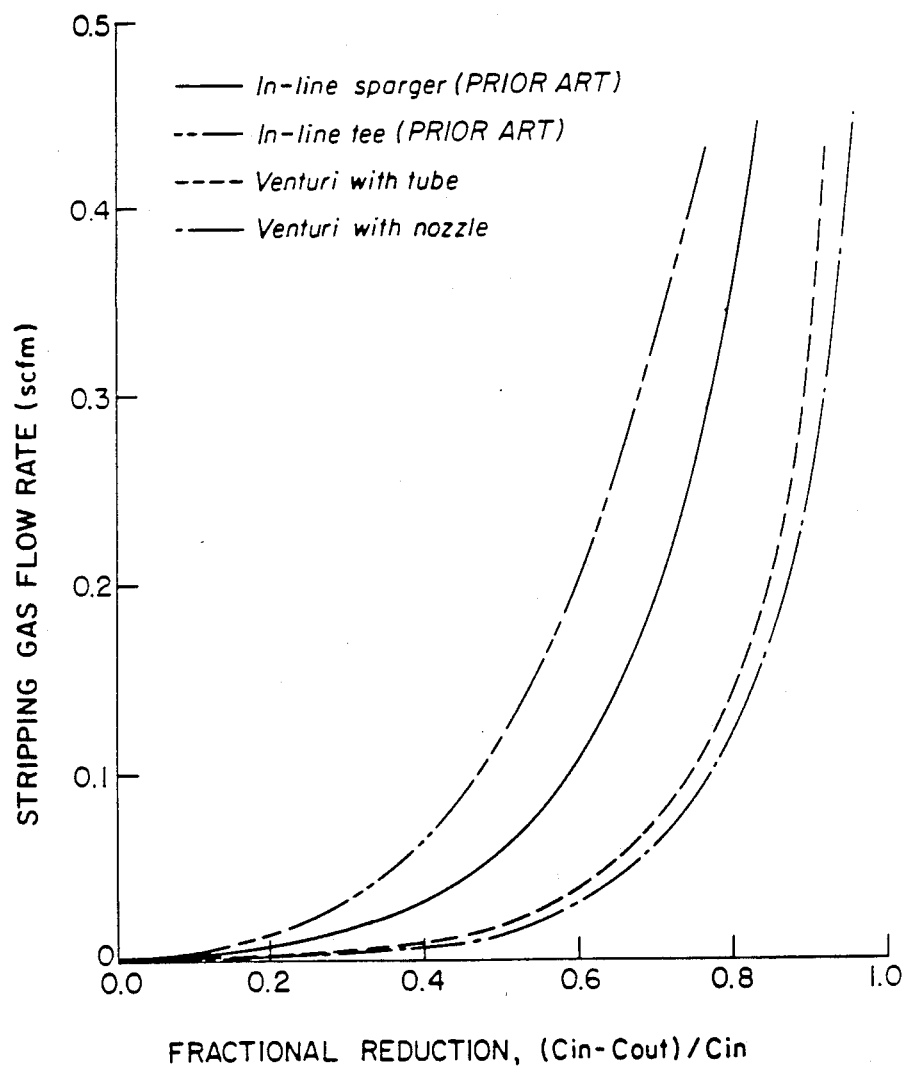
FIG. 5 shows a comparison of stripping gas consumption required to produce a given volatile component fractional reduction for various types of in-line stripping systems.

As shown in FIG. 5, given a constant stripping residence time, including residence time in the in-line stripping device and in downstream piping, the in-line sparger provides a significantly better fractional reduction in oxygen content of the water than the in-line tee. The latter two separation devices, preferred embodiments of the present invention, which comprise a venturi configuration to accelerate the fluid flow of a water-oxygen-nitrogen composition to supersonic linear velocity, provide a substantial improvement in fractional reduction of oxygen content over both the in-line tee and in-line sparger.

Figure 6:
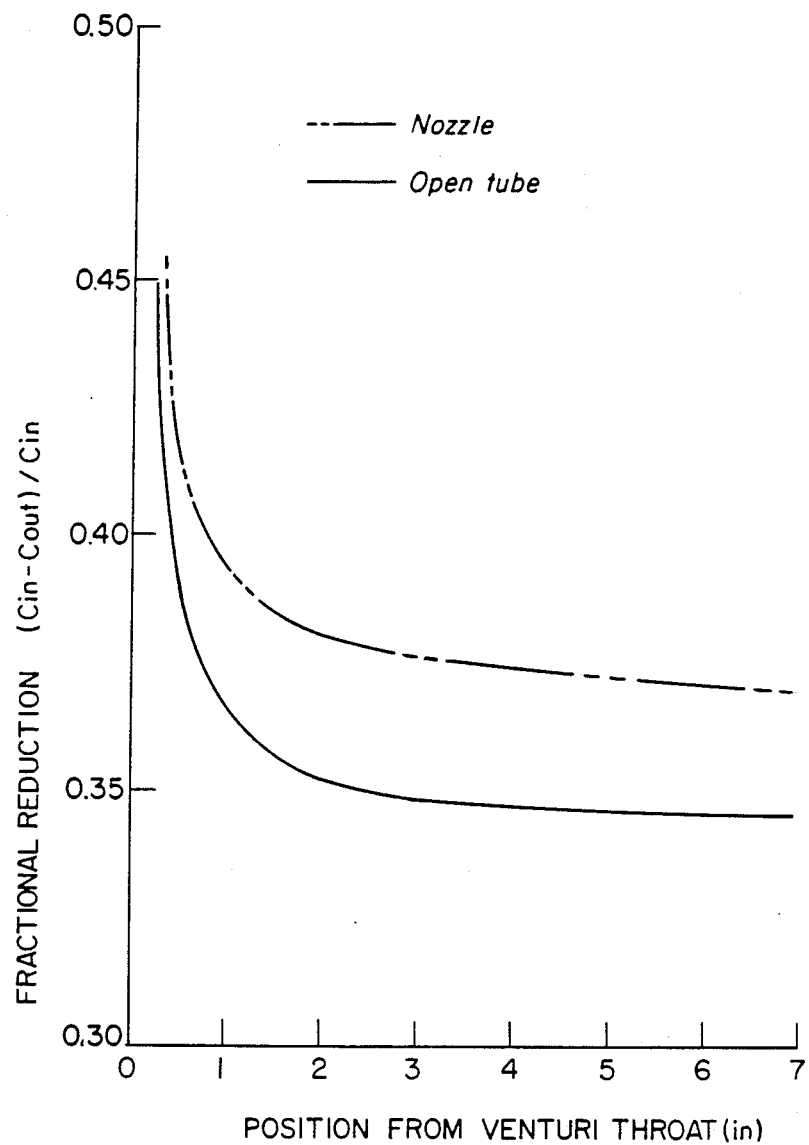
FIG. 6 shows a comparison of the fractional reduction of a volatile component in a liquid as a function of the in-line stripping device. In one case an open tube was used to feed stripping substance into an in-line venturi configuration. In the second case, a nozzle was used to feed stripping substance into the in-line venturi configuration.

As shown in FIG. 6, a device comprising a venturi with nozzle stripping substance injector performs better than a device comprising a venturi with open tube injector. The venturi with nozzle device was particularly useful for removing oxygen from water when the initial concentration of oxygen in the water was particularly high.

Figure 7:
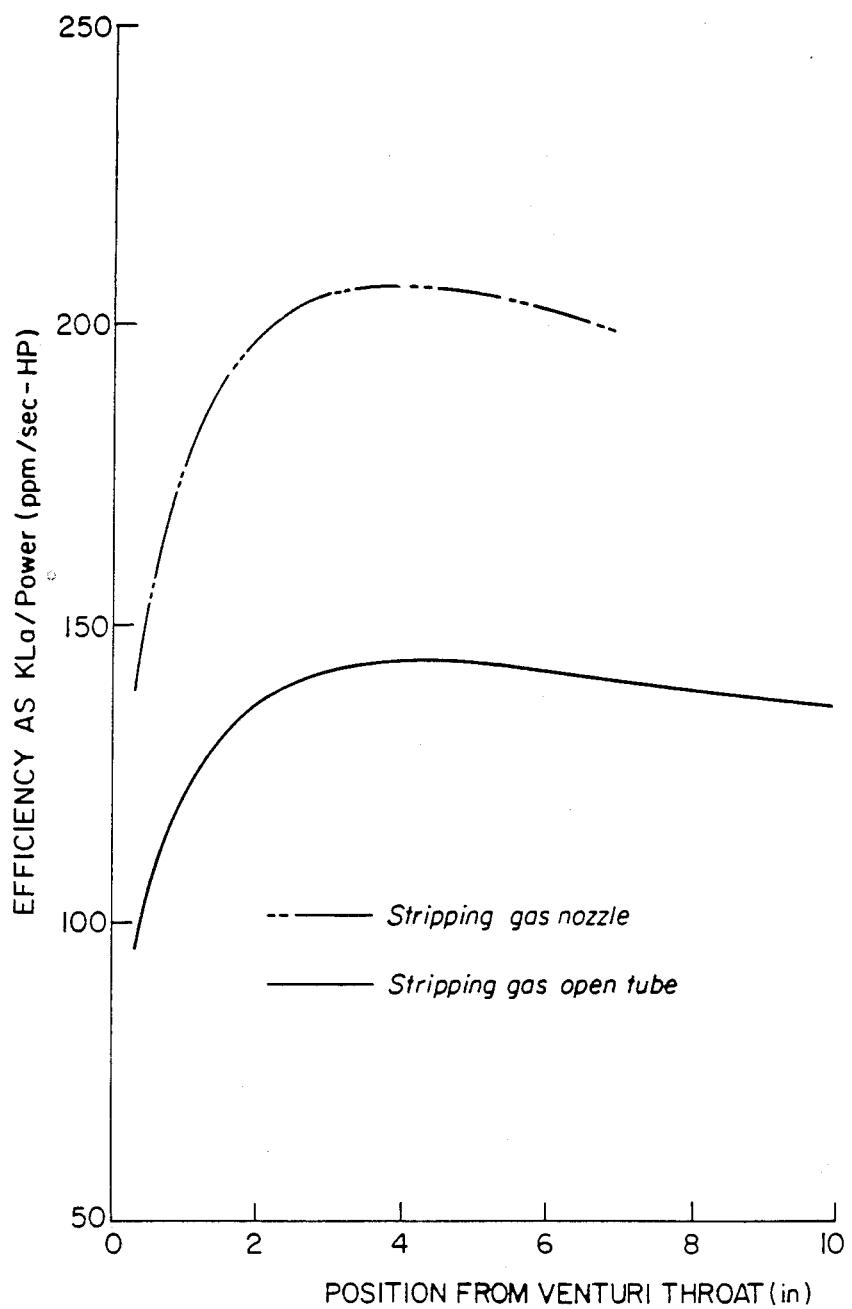
FIG. 7 shows the efficiency of the in-line stripping device as a function of the position of the stripping substance injector relative to the in-line venturi, for both an open tube injector and for a nozzle injector. The efficiency is expressed as the mass transfer coefficient, KLa (ppm/sec), divided by the power consumption in horsepower.

FIG. 7 shows that although the oxygen removal rate was increased for the open tube injector plus venturi by moving the tube closer to the venturi throat, the fractional reduction of oxygen achieved using the tube injector plus venturi was always less than that for the high velocity nozzle injector plus venturi, at any given nozzle position. It is believed the size of stripping substance bubbles generated by the sonic shock wave within the water-oxygen-nitrogen composition may directly proportional to the size of the nitrogen stripping substance bubble entering the flow accelerating device prior to the sonic shock wave. The bubble exiting the open tube was considerably larger than that exiting the high pressure nozzle. In addition, it is likely a tapered nozzle provides extra momentum or velocity to the centerline of the stripping substance velocity profile, thereby assisting in the production of a more extensive shockwave within the composition, and generating smaller bubbles in a more uniform distribution across the venturi device configuration.

The in-line tee shown in FIG. 1 comprised a pipe 2 having an inside diameter of about 0.82 inches and a tee joined pipe 4 having an inside diameter of about 0.82 inches. Room temperature water saturated with about 9 ppm of oxygen was fed into tee joined pipe 4 at a pressure of about 4 to 8 psig at a volumetric flow rate of about 3 gal/min (gpm). Room temperature nitrogen stripping gas having an oxygen concentration of about 1 ppm was fed into pipe 2 through a tube 6 having an inside diameter of about 0.25 inches. Tube 6 was spaced concentrically inside pipe 2. The end of tube 6 was placed approximately at the center of the inlet from tee joined pipe 4 into pipe 2, as shown in FIG. 1. The pressure of the room temperature nitrogen in tube 6 was about 4 to 8 psig, respectively. The volumetric flow rate of nitrogen varied between about 0 standard cubic ft./min. (scfm) and about 0.5 scfm, as shown in FIG. 5. The residence time of the water-oxygen-nitrogen composition within the in-line device was about 0.25 seconds and the residence time in downstream piping prior to sampling the water for oxygen content (Cout) was about 13 seconds. The fractional reduction of oxygen within the water for various nitrogen flow rates is shown in FIG. 5. The fractional reduction of oxygen is equal to the oxygen concentration of the incoming water (Cin) minus the oxygen concentration of the processed water (Cout), measured at the end of the 500 inch long pipeline, the difference divided by the oxygen concentration of the incoming water (Cin). The data for the in-line tee of FIG. 1 is provided for comparison purposes only, since tee type gas-liquid mixing systems are known in the art.

The in-line sparger arrangement shown in FIG. 2 comprised a pipe 10, having an inside diameter of about 0.82 inches and a tee joined pipe 12 having an inside diameter of about 0.82 inches. The sparging device 14 comprised a sintered metal cylinder with a porosity size of about 3 micrometers, which permitted gas flow out from within the cylinder. The sparging device 14 was positioned concentrically within pipe 10 so that about one half of the cylinder length extended on each side of the centerline of tee joined pipe 12, as shown in FIG 2. Sparging device 14 was about 0.88 inches in length, having an outside diameter of about 0.5 inches. Room temperature water saturated at an oxygen concentration of about 9 ppm was fed into tee joined pipe 12 at a pressure of about 3 to 6 psig and at a volumetric flow rate of about 3 gpm. Room temperature nitrogen having an oxygen content of about 1 ppm was fed into sparging device 14 through an inlet tube 16. The nitrogen pressure in inlet tube 16 was less than about 40 psig, and the volumetric flow rate of the nitrogen was varied between about 0.0 and about 0.5 scfm as shown in FIG. 5. The residence time of the water-oxygen-nitrogen composition within the in-line device and downstream piping prior to analysis for processed water oxygen content was about the same as for the in-line tee. Oxygen was stripped from the incoming water by the nitrogen gas passing through the water. The fractional reduction in the oxygen concentration of the water at various nitrogen flow rates is shown in FIG. 5. This data is presented for comparison purposes only, as use of porous metal spargers to mix gas into a liquid is considered to be known in the art.

In accordance with the present invention, the in-line separation device shown in FIG. 3 comprised a pipe 20 about 0.82 inches in inside diameter, fitted with a venturi configuration 22 having a compression cone 24, a throat 26 and an expansion cone 28. The included angle 30 of compression cone 24 was about 21 degrees. The throat 26 was about 0.16 inches in diameter, having a throat length of about 0.16 inches. The included angle 32 of expansion cone 28 was about 15 degrees. Upstream of venturi configuration 22 was an open tube 34 which was positioned concentrically in the center of tube 20 through a sleeve 36 which extended through a cap 38 on the end of tube 20. A tee joined tube 40 extended from tube 20 upstream of venturi device 22 at a location near the entrance of open tube 34, as shown on FIG. 3. Open tube 34 had an inside diameter of about 0.18 inches and open tube 34 could be moved within sleeve 36 so that the position of the end 42 of tube 34 could be moved relative to venturi configuration 22. The position of the end 42 of tube 34 was about 7 inches from the beginning of venturi throat 26 at the time the data presented in FIG. 5 was gathered. At this location, the end 42 of tube 34 was upstream of the beginning of compression cone 24 by about 5.2 inches. Subsequent data has demonstrated the venturi with open tube device of FIG. 3 would have performed even better had the end 42 of tube 34 been positioned within compression cone 24. Room temperature water at a saturated oxygen concentration of about 9 ppm was fed into tee joined pipe 40 at a pressure of about 16 to 35 psig and at a volumetric flow rate of about about 3 gpm. Room temperature nitrogen having an oxygen concentration of about 1 ppm was fed through open tube 34 into pipe 20. The pressure in open tube 34 was less than about 40 psig, and the volumetric flow rate of nitrogen was varied between about 0.0 and about 0.5 scfm as shown in FIG. 5. Oxygen was stripped from the incoming water by the nitrogen gas passing through the water. The water-nitrogen composition downstream of open tube 34 was passed through venturi configuration 22 so that the linear velocity of the composition exiting venturi throat 26 ranged from about 50 ft/sec at zero nitrogen flow to about 112 ft/sec at 0.5 scfm of nitrogen flow. Depending on the nitrogen gas fraction of the water-oxygen-nitrogen composition, linear velocities as low as 50 ft/sec can provide theoretical supersonic velocity for the composition. The fractional reduction in the oxygen concentration of the water at various nitrogen flow rates is shown in FIG. 5. It is surprising to find such an improvement in fractional reduction for the venturi with tube over the prior art devices at nitrogen flow rates as low as 0.01 scfm. One would not have expected the improvement observed without supersonic flow of the water-oxygen-nitrogen composition in the tube-venturi device. Yet. the calculated average linear velocity of the composition based on the data of Kieffer is below supersonic. This unexpected improvement in performance is attributed to the concept, previously discussed, that it is possible to have supersonic velocity at a particular point in the fluid flow profile within the device but not at another. Thus, the average linear velocity may be below theoretical supersonic flow, but a sonic shockwave may occur at point locations within the flow profile. Of course optimum device performance occurs when the average linear velocity is supersonic.

In accordance with the present invention, the in-line separation device shown in FIG. 4 comprised a pipe 50 about 0.82 inches in inside diameter, fitted with a venturi configuration 52 having a compression cone 54, a throat 56, and an expansion cone 58. The included angle of compression cone 54 was about 34 degrees. The throat 56 was about 0.19 inches in diameter, having a throat length of about 0.36 inches. The included angle of expansion cone 58 was about 35 degrees. Upstream of venturi throat 56 was a nozzle section 60 extending from tube 62. Tube 62 was positioned concentrically in the center of pipe 50. During the early period of experimentation, tube 62 extended through a sleeve into an open housing area. The open housing area had an entering pipe and an exiting pipe, each about 0.82 inches in diameter; the center lines of the two pipes being at right angles, with the housing connecting them. Tube 62 extended through the housing with its centerline concentric to venturi throat 56. Subsequent to early work, including Example 1, the housing section and entering pipe were replaced with a 90 degree long elbow 64 as shown in FIG. 4. Sleeve 66 extended through elbow 64 so that tube 62, including nozzle section 60 could be moved relative to venturi configuration 52. The inside diameter of pipe 50 entering and the inside diameter of elbow 64 were about 0.82 inches. Nozzle section 60 comprised an entrance inside diameter 68 of about 0.13 inches. A conical section 70 joined the entrance portion of the nozzle to the exit opening 72 which was about 0.063 inches in diameter. The details of nozzle section 60 are shown in FIG. 4A. Room temperature water at a saturated oxygen concentration of about 9 ppm was fed into the entrance pipe through the open housing into pipe 50. The pressure in pipe 50 upstream of venturi configuration 52 was about 15 to 36 psig (15 psig at no nitrogen flow), at a volumetric flow rate of about 3 gpm. The pressure in pipe 50 upstream of venturi configuration 52 was reduced by about 3 to 6 psig at the volumetric flow rate of about 3 gpm with the benefit of elbow 64 in place, as shown in FIG. 4. Room temperature nitrogen having an oxygen content of about 1 ppm. was fed through tube 62 into nozzle 60 at a pressure less than about 40 psig in tube 52 and at a volumetric flow rate ranging from about 0.0 to about 0.5 scfm as shown in FIG. 5. Oxygen was stripped from the incoming water by the nitrogen gas passing through the water by nitrogen gas passing through the water. The water-oxygen-nitrogen composition downstream of nozzle 60 was passed through venturi configuration 52 so that the velocity of the composition exiting venturi throat 56 ranged from about 50 ft/sec at zero nitrogen flow to about 112 ft/sec at 0.5 scfm nitrogen flow. As previously discussed, theoretical supersonic velocity for the composition can occur within this range. The residence time of the water-oxygen-nitrogen composition was about 0.25 seconds in the in-line device and about 13 seconds in downstream piping, as previously described. The fractional reduction in oxygen concentration in the water at various nitrogen flow rates is shown in FIG. 5.

The FIG. 5 fractional reduction in oxygen content=

(Cin−Cout)/Cin, wherein Cin=initial oxygen concentration in the water entering the in-line device, and Cout=oxygen concentration in the water, at the end of the 500 inch length of piping previously discussed.

A single pass of the room-temperature water through the venturi with nozzle device provided a fractional reduction of about 0.94 at a flow rate of about 0.4 scfm nitrogen. Thus, the oxygen concentration was reduced from about 9 ppm to about 0.5 ppm. This compares with the venturi with open tube device which provided a reduction from about 9 ppm to about 1.0 ppm at the same nitrogen flow rate. The in-line sparger of the type shown in FIG. 2, provided an oxygen concentration reduction from about 9 ppm to about 1.6 ppm at the 0.4 scfm nitrogen flow rate, and the in-line tee provided a reduction from about 9 ppm to about 2.2 ppm. As indicated in FIG. 5, the nitrogen usage rate becomes asymptomatical as the fractional reduction in oxygen content approaches 1. Thus, there is a point of diminishing returns for increased nitrogen usage in a single pass removal of oxygen at a given residence time.

EXAMPLE 2

FIG. 6 shows the effect of nozzle or open tube injector position relative to the venturi throat. For any given position from the venturi throat, the high velocity nozzle provides a better oxygen fractional reductions all other variables being substantially equivalent. This phenomenon is attributed to the smaller nitrogen bubble size leaving the nozzle as compared with the bubble size leaving the open tube and the increased linear velocity of the nitrogen at the center of the nozzle flow profile, as previously discussed.

The data presented in FIG. 6 was generated using the open tube with venturi stripping device of FIG. 3 and the nozzle with venturi stripping device of FIG. 4, except that the open housing was present in the liquid flow line rather than the long 90° elbow shown in FIG. 4. Oxygen was stripped from room temperature water saturated at about 9 ppm of oxygen, using nitrogen having an oxygen content of about 1 ppm. The residence time in stripping device was about 19 seconds, including the residence time in the 500 inches of piping. The water flow rate was about 3 gpm, at a pressure ranging from about 22 to 34 psig upstream of the stripping device, depending on the position of the nozzle relative to the venturi throat. The nitrogen flow rate was about 0.08 scfm at a pressure of less than about 40 psig in the tube leading to the open end exit or leading to the nozzle exit.

The principal limiting factor in tube or nozzle location is the pressure drop across the system, measured as differential pressure across the inlet and outlet to the in-line device. The pressure drop increases as the tube or nozzle is moved closer to the venturi throat. The increase in pressure drop across the in-line stripping device is evidenced by the increased pumping power requirements necessary to maintain a given volumetric throughput rate for the liquid mixture.

FIG. 7 shows one measure of the stripping efficiency for an in-line device. Efficiency, as mass transfer coefficient or mass transfer rate divided by pumping horsepower, is shown as a function of the stripping substance injection position relative to the venturi device throat entrance.

For the system described in this example, the pressure drop across the tube with venturi device, with the tube end 42 positioned about 2 inches upstream of the entrance to venturi throat 26 was about 16 psi. This compared with a pressure drop of about 19 psi when tube end 42 was placed about one inch from the entrance to throat 26, compared with a pressure drop of about 23.5 psi when tube end 42 was placed about 0.5 inches from the entrance to the venturi throat 26. Pressure drops across the nozzle plus venturi device were about 16.5 psi when the nozzle was positioned about 2 inches from the entrance to venturi throat 26, about 20 psi when nozzle end 72 was positioned about one inch from venturi throat 26, and about 24 psi when nozzle end 72 was positioned about 0.5 inches from venturi throat 26. One skilled in the art desiring to use the present invention would consider the acceptable pressure drop (or cost of recovering pressure) in determining the practical location of the stripping substance injector relative to the entrance to the venturi throat. It is apparent from FIG. 7 that for a given throughput rate and liquid mixture-stripping substance composition, there is an optimum tube or nozzle position relative to the venturi configuration, in terms of stripping efficiency.

Pressure drop can be reduced by increasing the venturi throat or minimum opening diameter or by reducing the diameter of the injector relative to the venturi throat or minimum opening diameter. This permits the injector to be positioned closer to the venturi throat or minimum opening diameter while holding the pressure drop constant.

Pressure drop across the in-line device of the present invention also increases with increased loading of stripping substance in the mixture-stripping substance composition.

The other factor which must be taken into account in determining overall system efficiency is the amount of stripping substance consumed to provide the necessary volatile component concentration in the processed mixture.

EXAMPLE 3

Figure 8:
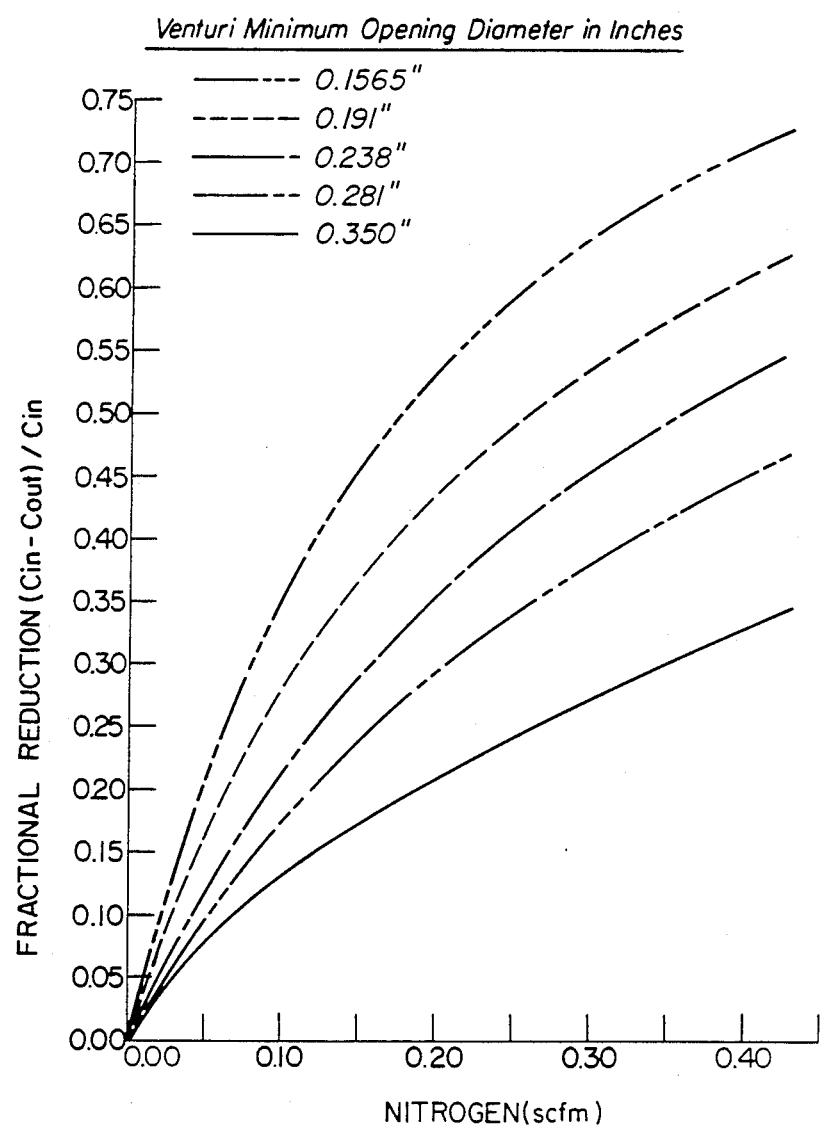
FIG. 8 shows the fractional reduction of volatile component in a liquid as a function of stripping device venturi throat size at varying stripping substance volumetric feed rates.

Another important variable affecting the size of stripping substance bubbles formed, and thus mass transfer rate of the volatile component from the mixture to the stripping substance, is the minimum diameter opening of the venturi device. This may be the venturi throat diameter or the diameter of the opening between the compression cone and the expansion cone. FIG. 8 shows the fractional reduction in oxygen content of room temperature water at various nitrogen flow rates, as a function of the minimum opening diameter (throat diameter in this case) of the venturi device.

The data shown in FIG. 8 was generated using a venturi with nozzle type device similar to that shown in FIG. 4. Five different venturi configurations, each with a different throat diameter were evaluated. The length of each venturi throat was the same as its diameter. The compression cone and expansion cone included angles remained as previously described. The incoming room temperature water, oxygen concentration was about 10 ppm and the pressure in pipe 50 upstream of the stripping device ranged from about 19 psig at zero nitrogen flow for the smallest diameter throat to about 10 psig at zero nitrogen flow for the largest diameter throat. The water volumetric flow rate was about 3 gpm. The room temperature nitrogen stripping gas oxygen content was about 1 ppm. Pressure in the nitrogen-containing tube upstream of the nozzle was varied as necessary to obtain the desired nitrogen flow rate in scfm. As shown in FIG 8, for a given nitrogen flow rate, a decrease in venturi throat diameter increases the fractional reduction in oxygen content of the water.

Some of the larger venturi throat sizes shown in FIG. 8 were designed to provide slightly less than theoretical subsonic linear flow velocity. For example, at a nitrogen volumetric flow:water volumetric flow of 1:1, and a water flow rate of about 3 gpm, the linear velocity of the water-oxygen-nitrogen composition through the largest throat diameter is about 20 ft/sec. This compares with 100 ft/sec for the smallest throat diameter at the same volumetric flow rates. Although the fractional oxygen reduction curves for the larger throat diameter do not follow the same shaped path as the curves for the smaller throat diameters, the clear performance distinction expected for theoretical subsonic flow compared with theoretical supersonic flow did not appear. It is believed each venturi configuration may generate supersonic flow along some flow paths within the configuration but not along others; Thus, although there was not supersonic flow across the entire device profile, there were localized shock waves in specific locations at which supersonic flow was achieved. As a result the oxygen removal achieved was better than expected.

For example, the calculated average linear flow velocity may be subsonic, but the velocity profile across the venturi throat is not constant due to wall effects, etc. and the linear velocity at the center of the profile may be supersonic.

Figure 9:
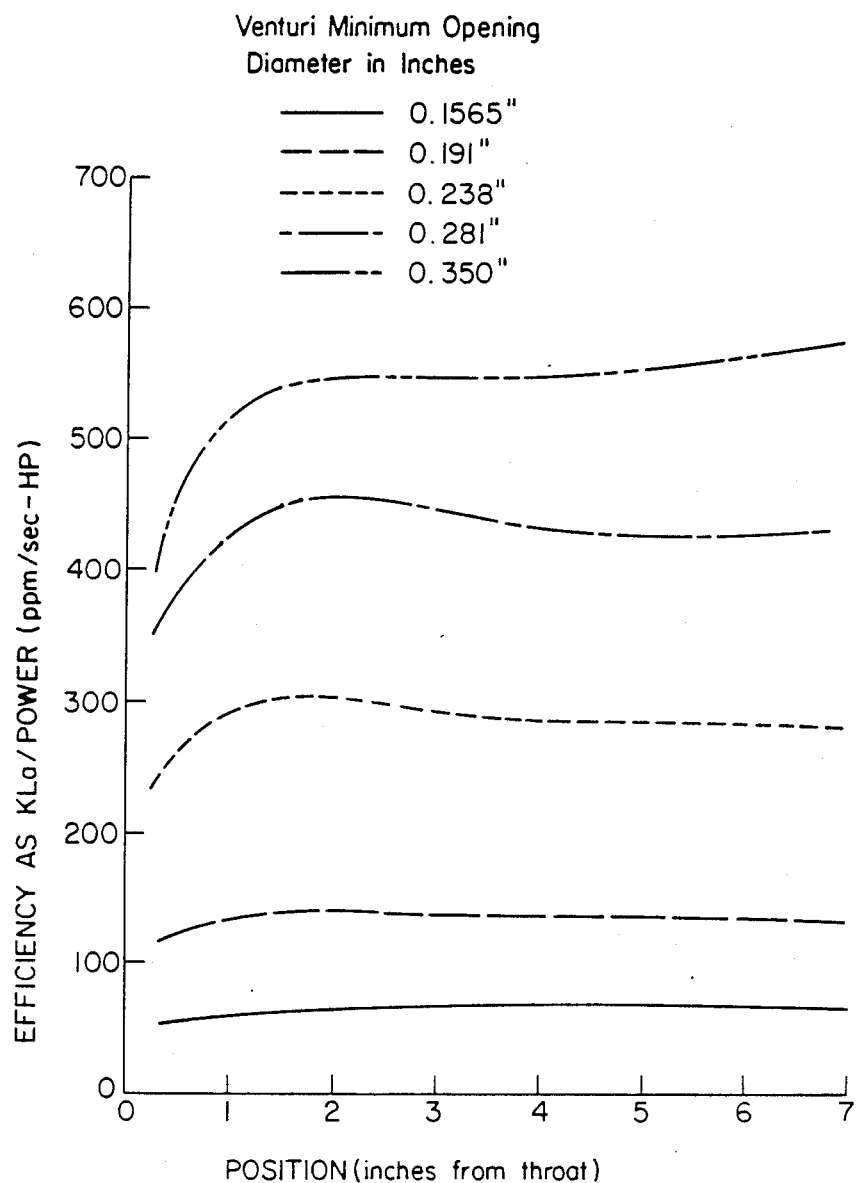
FIG. 9 shows the efficiency of the in-line stripping device as a function of venturi throat size.
Figure 10:
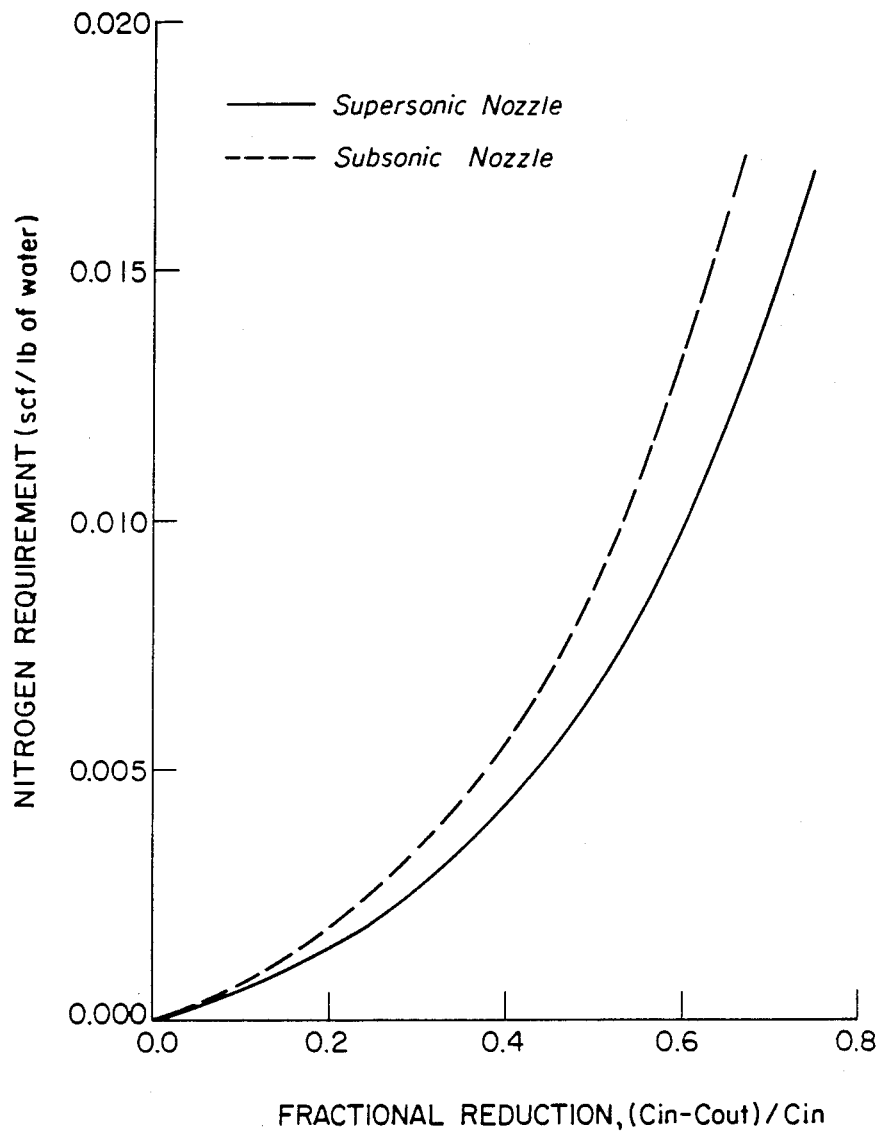
FIG. 10 shows a comparison of the stripping substance (nitrogen) consumption per pound of liquid mixture (water and oxygen) to provide various oxygen fractional reductions (using a nozzle venturi device of the type shown in FIG. 4), as a function of linear velocity of the stripping substance (nitrogen) exiting the injection nozzle.

FIG. 9 shows the stripping efficiency corresponding to FIG. 8, as mass transfer coefficient divided by pumping horsepower, as a function of venturi throat size. There is an optimum venturi throat size for a given stripping application.

Reviewing the apparatus variables, then, for a given processed mixture volatile component concentration, both the injector position relative to the minimum venturi opening, and size of the opening itself must be carefully considered in designing the separation device. These apparatus variables must be balanced against the amount of stripping substance consumed.

EXAMPLE 4

This example and several which follow are intended to illustrate the potential wide range of applications for which the method and apparatus of the present invention can be used. It is not intended that these examples be limiting, since one skilled in the art can, with minor modifications, use the invention for so many different applications.

Figure 11:
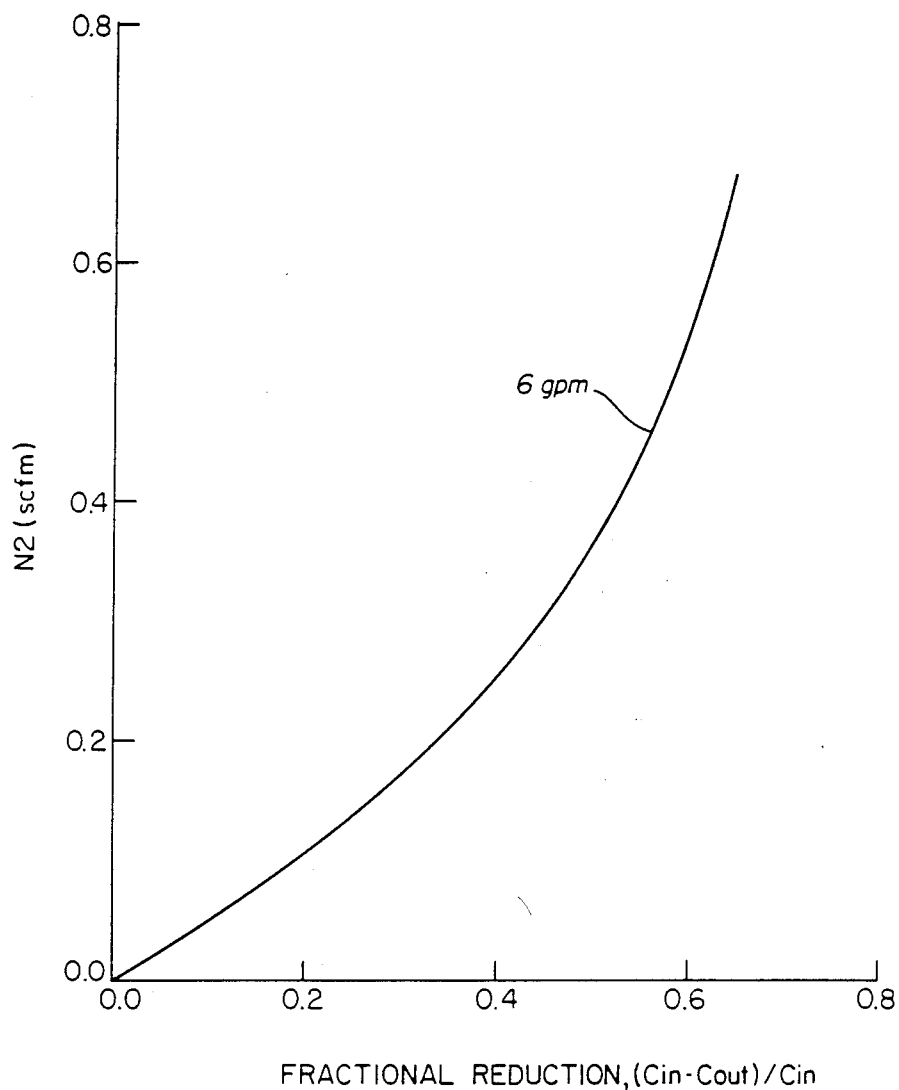
FIG. 11 shows volumetric nitrogen stripping gas requirements, in scfm, to achieve various oxygen fractional reductions in soybean oil (using a nozzle venturi device of the type shown in FIG. 4.) as a function of the volumetric flow rate of the soybean oil.

Oxygen was separated from refined soybean oil using a nitrogen stripping has in the stripping apparatus shown in FIG. 4. The fractional reduction of oxygen content in the soybean oil as a function of nitrogen stripping gas flow rate is shown in FIG. 11. The nitrogen injection nozzle was positioned about 0.25 inches upstream of the venturi throat, which was about 0.19 inches in diameter. The initial oxygen content of the soybean oil was about 37 ppm. The initial oxygen content of the room temperature nitrogen stripping gas was about 1 ppm. When the soybean oil processing temperature was about 33° C., the soybean oil flow rate was about 6 gpm, and the nitrogen flow rate was about 0.38 scfm, a single pass through the stripping device decreased the oxygen content from the about 37 ppm to about 19 ppm. After separation of the oxygen saturated nitrogen stripping gas from the soybean oil using gravity, a second pass through the stripping device (under the same operating conditions) reduced the oxygen content in the soybean oil from the about 19 ppm to about 10 ppm.

When the soybean oil processing temperature was about 45° C., the soybean oil flow rate was about 6 gpm, and the nitrogen flow rate was about 0.66 scfm, a single pass through the stripping device decreased the oxygen content from the about 37 ppm to about 11 ppm. A second pass through the device, after separation as described above, reduced the oxygen content in the soybean oil from the about 11 ppm to about 3.6 ppm.

The amount of nitrogen required to obtain a given fractional reduction in oxygen content of the soybean oil is considerably higher than that required for the same oxygen fractional reduction in water. Compare FIG. 11 with FIG. 5. This is because the soybean oil is a highly viscous liquid which reduces the oxygen diffusion rate from the 0:1 into the nitrogen stripping gas. In addition, the initial oxygen saturation concentration in soybean oil is about 4 times greater than the oxygen saturation in water at the same temperature. Nitrogen consumption is affected by the initial oxygen content of the soybean oil, the initial oxygen content of the nitrogen, the oil-nitrogen composition flow rate through the stripping device, and the composition temperature.

It has been discovered that the achievable fractional reduction can be increased by increasing the temperature of the liquid mixture to be stripped, as demonstrated herein. Although the solubility of the oxygen in the soybean oil increases with temperature, the increase in oxygen diffusion rate from the oil into the nitrogen stripping gas more than compensates for changes in oxygen solubility.

Since it was not possible to achieve a fractional reduction in oxygen content greater than about 0.7 without undue pressure drop across the in-line device and without using undue amounts of nitrogen stripping gas, multiple stage stripping with separation of the stripping gas from the oil after each stage were used, as described above, to obtain oxygen fractional reductions up to about 0.9.

EXAMPLE 5

Figure 12:
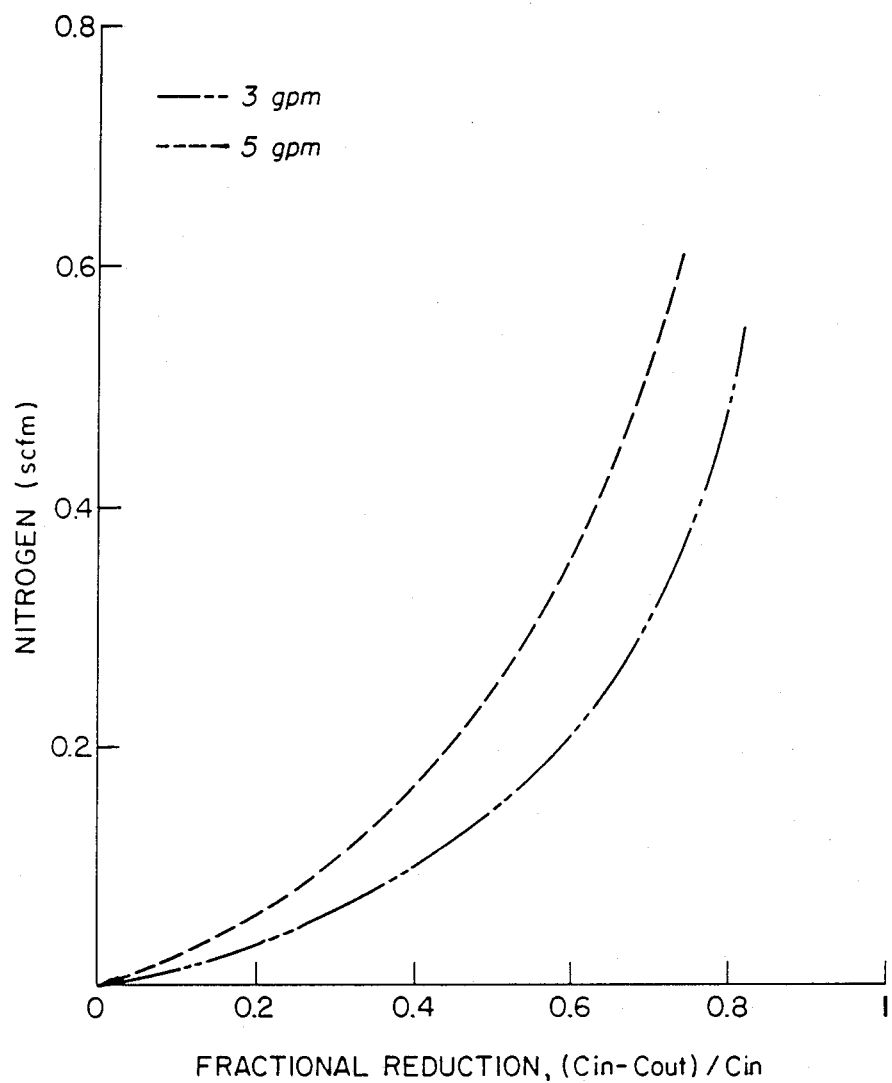
FIG. 12 shows volumetric nitrogen stripping gas requirements, in scfm, to achieve various oxygen fractional reductions in corn oil (using a single stage nozzle-venturi stripping device of the type shown in FIG. 4), as a function of the volumetric flow rate of the corn oil.

Oxygen was removed from crude corn oil using the stripping apparatus shown in FIG. 4. The fractional reduction of oxygen content in the corn oil as a function of nitrogen stripping gas flow rate and corn oil flow rate is shown in FIG. 12. The nitrogen injection nozzle position and venturi throat diameter were the same as in EXAMPLE 4. The initial oxygen content of the corn oil was about 38 ppm. The initial oxygen content of the room temperature nitrogen stripping gas was about 1 ppm. The corn oil processing temperature was about 30° C.

Figure 13:
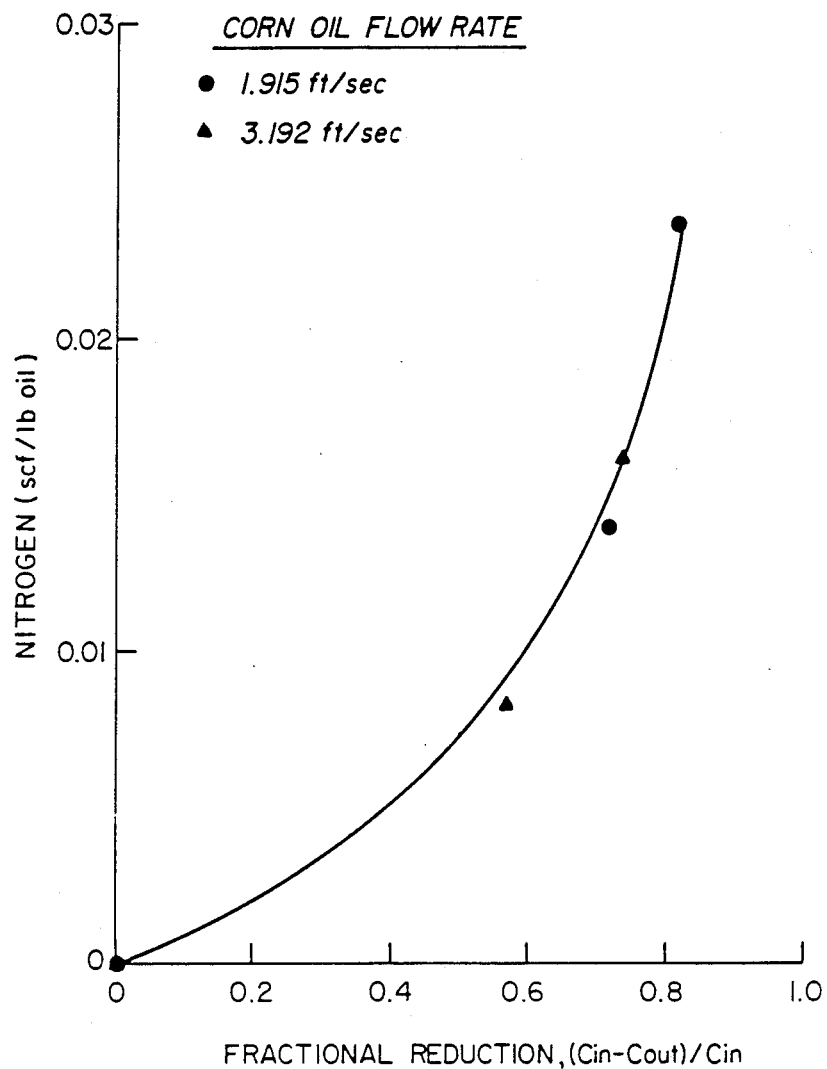
FIG. 13 shows nitrogen stripping gas consumption per pound of corn oil to achieve various oxygen fractional reductions (for a single stage nozzle-venturi device of the type shown in FIG. 4), as a function of linear velocity of the nitrogen-corn oil composition through the in-line device.

It was discovered, as shown in FIG. 13, that the oxygen fractional reduction achievable is independent of the linear velocity of the corn oil-nitrogen composition through the venturi configuration, so long as the composition linear velocity is supersonic and the total residence time for the in-line device and downstream piping is at least 5 seconds.

EXAMPLE 6

The in-line stripping device shown in FIG. 4 was used to remove oxygen from an aqueous solution of ethyl carboxycellulose. The end of the nitrogen injection nozzle 70 was positioned about 0.25 inches upstream of the venturi throat which was about 0.19 inches in diameter and 0.36 inches in length.

The concentration of ethyl carboxycellulose in the solution ranged from about 0.15 percent by weight (having a room temperature viscosity of about 5 cps) to about 0.42 percent by weight (having a room temperature viscosity of about 53 cps). The initial, saturated oxygen content of a typical room temperature ethyl carboxycellulose solution was about 8 ppm. The initial oxygen content of the room temperature nitrogen stripping gas was about 1 ppm. The volumetric solution flow rate was varied from about 3 to about 5 gpm and the volumetric nitrogen stripping gas flow rate was varied from about 0.025 scfm to about 0.26 scfm.

Figure 14:
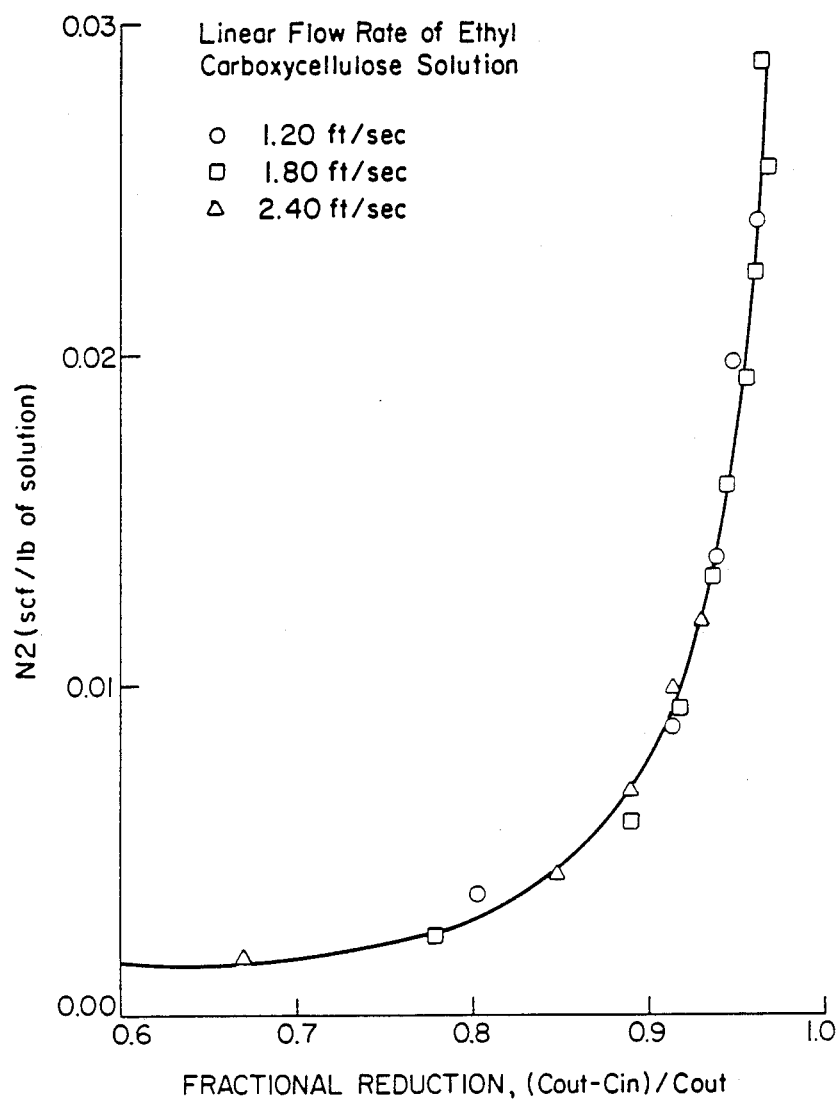
FIG. 14 shows nitrogen stripping gas consumption per pound of ethyl carboxycellulose solution to achieve various oxygen fractional reductions (for a single stage nozzle-venturi device of the type shown in FIG. 4), as a function of linear velocity of the nitrogen-ethyl carboxycellulose solution composition through the in-line device.

FIG. 14 shows the fractional reduction in oxygen content of an ethyl carboxycellulose solution as a function of nitrogen-stripping gas loading and linear velocity of the solution-stripping gas composition through the in-line stripping device.

The oxygen removal was carried out in a steady state, single stage stripping operation using an in-line device of the type shown in FIG. 4. The pipe size was about 0.82 inches in internal diameter, and the Cout oxygen concentration measurement was made downstream of the in-line stripping device, after 500 inch length of pipe. The system temperature was about 18° C. and the viscosity of the ethyl carboxycellulose solution was about 5.5 cps.

The fractional reduction in oxygen concentration as a function of nitrogen stripping gas loading was studied at gas loadings as high as 160 percent by volume. No phase separation was found at the 160 percent by volume nitrogen stripping gas loading in an ethyl carboxycellulose solution having a viscosity of about 53 cps, at about 27° C.

EXAMPLE 7

Molten aluminum reacts readily with moisture in the air forming hydrogen and aluminum oxide. Hydrogen will remain in the aluminum since it is quite soluble above the melting point of aluminum. The hydrogen must be removed from the molten metal before casting, otherwise cracks or voids may occurs when the hydrogen is driven off at the solidifying temperature of aluminum. The usual procedure for hydrogen removal is to bubble nitrogen, argon or mixtures of inert gases (with very low solubility) through a bath of the molten metal. The molten metal is then overflowed from the bath into a degassing unit where the gas bubbles will rise to the surface and be skimmed off. The inert gas will also remove particulates such as aluminum oxide or other solid impurities. The particulates will adhere to the inside of the gas bubbles due to surface tension. Particulate removal is a important part of the process. The batch process described above, has very low stripping efficiency, however, because of back-mixing of low and high purity materials in this batch mode. The partial pressure of hydrogen in the gas phase is proportional to the square of the hydrogen concentration in the liquid phase. Therefore, the driving force in batch stripping operations becomes quite small as stripping continues.

Use of an in-line stripping device enables contacting a stripping gas with the molten aluminum when the molten aluminum is at its highest concentration of hydrogen and particulates. Therefore, the equilibrium driving forces will be maximized. Molten aluminum at about 700° C. is pumped or pressure transferred from a melting pot through the in-line stripper to a degassing hold tank. The pump and pipings and the in-line stripping device are comprised of or are lined with refractory materials such as graphite, silicon nitrite, or silicon carbide, etc. Preferred stripping gases include nitrogen and argon. A small trace of chlorine may be added to the stripping gas to assist in removal of alkaline metals. Stripping gas at a volumetric flowrate of about 10 scfm is able to handle about 60,000 lb/hr of molten aluminum in a 2.5 inch diameter in-line stripping unit. Stripping gas consumption is about 19.9 scf/ton of aluminum. The optimized stripping gas consumption will vary depending on the concentration of the hydrogen in the molten aluminum; typically the hydrogen concentration ranges from about 0.1 to 0.4 cc/g.

Figure 15:
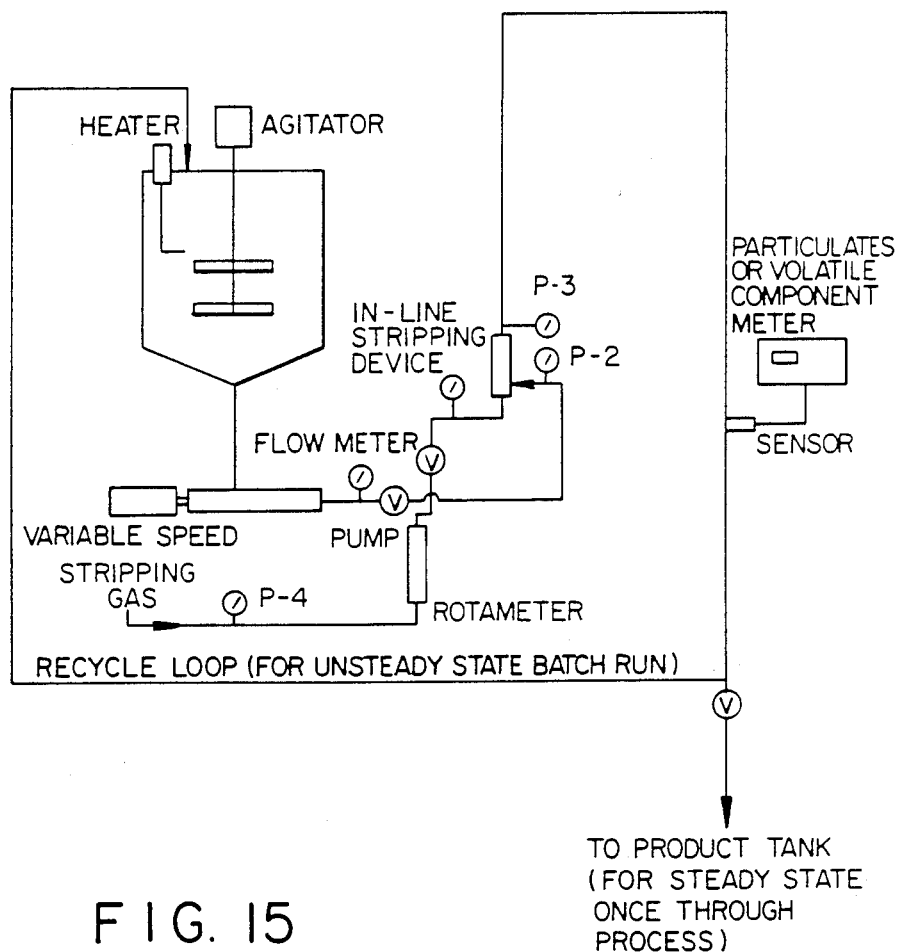
FIG. 15 shows a schematic for a typical stripping system installation, wherein the stripping device is placed in-line in a recycle loop of a reactor system, to provide for dissolved gas removal during a chemical process reaction.

A process flow diagram for a typical, not intended to be limiting, system for stripping a dissolved high vapor pressure component from a reaction mixture is shown in FIG. 15.

Figure 16:
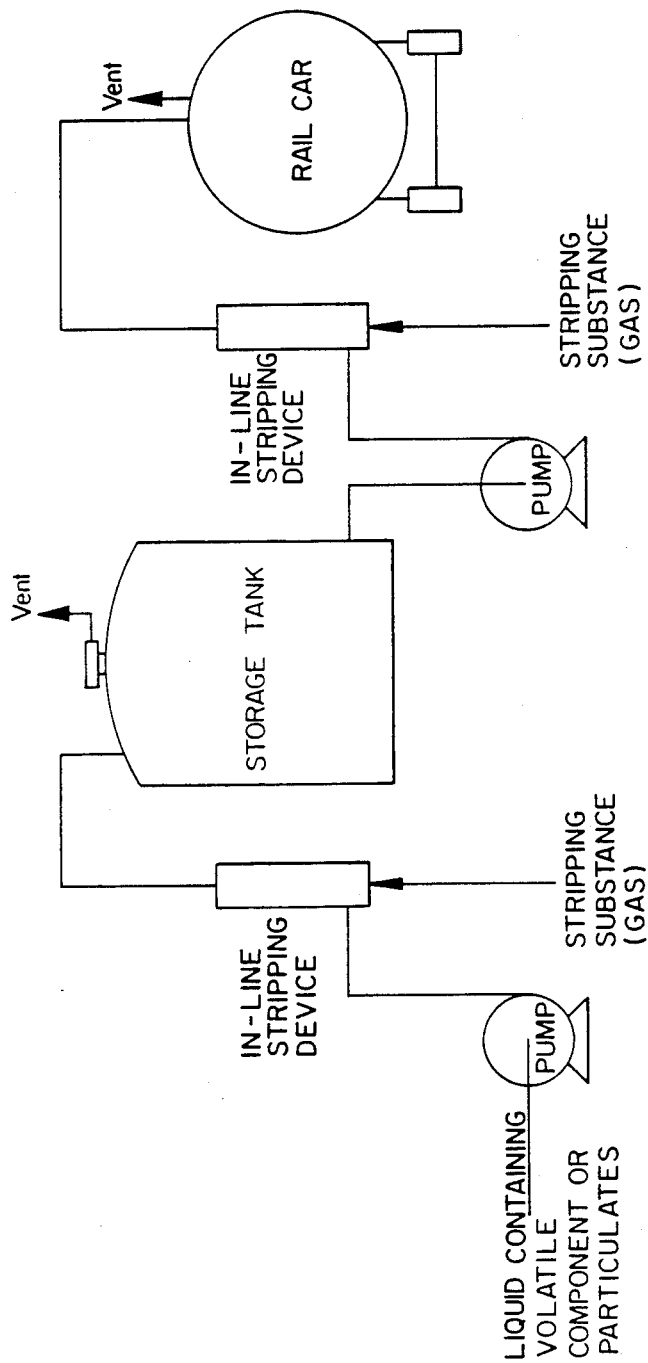
FIG. 16 shows a schematic for a typical stripping system installation, wherein the stripping device is placed in-line prior to storage and/or in-line between a storage tank and a shipping container for a fluid.

A process flow diagram for a typical, not intended to be limiting, system for removing a dissolved high vapor pressure component from a liquid to be stored and/or from a liquid to be shipped is shown in FIG. 16.

Removal of a gas such as oxygen from a liquid to be stored can prevent oxidation of component parts of that liquid during the storage period.

The above described in-line stripping techniques are applicable for removal of moisture from organic fluids such as fatty esters and methyl benzoate.

Only the preferred embodiments of the invention have been described above, and one skilled in the art will recognize that numerous substitutions, modifications and alterations are permissible without departing from the spirit and scope of the invention as demonstrated in the following claims.

What is claimed is:

1. A method of separating at least one gas or vapor present in a liquid from said liquid, said method comprising:
   (a) contacting said liquid with a stripping gas or vapor which is immiscible in or which has low solubility in said liquid under operating conditions, said stripping gas or vapor being different from said gas or vapor initially present in said liquid which is to be separated from said liquid;
   (b) causing cocurrent flow of a composition comprising said liquid and said stripping gas or vapor;
   (c) causing at least a portion of said concurrently flowing composition to flow at a linear velocity which is supersonic; and
   (d) separating said stripping gas or vapor from said liquid, whereby at least a portion of said gas or vapor which was present in said liquid initially is removed from said liquid.

2. The method of claim 1 wherein said stripping gas or vapor is initially contacted with said liquid by injecting said stripping gas or vapor into said liquid at an average linear velocity which is subsonic for said stripping gas or vapor.

3. The method of claim 1 or claim 2 wherein said supersonic flow of said at least a portion of said occurrently flowing composition is caused by passing said composition through an apparatus inside a pipeline.

4. The method of claim 3 wherein said liquid comprises an aqueous solution.

5. The method of claim 3 wherein said liquid comprises an aqueous dispersion or suspension.

6. The method of claim 3 wherein said liquid comprises an organic substance.

7. The method of claim 3 wherein said liquid comprises an organic solution.

8. The method of claim 3 wherein said liquid comprises an organic suspension or dispersion.

9. The method of claim 3 wherein said liquid comprises a fluid metal or fluid metal alloy.

10. The method of claim 3 wherein said apparatus comprises a venturi configuration.

11. The method of claim 10 wherein said venturi comprises a minimum opening diameter as large as possible and still provide sufficient supersonic velocity in said at least a portion of said flowing composition to accomplish the desired fractional reduction of said gas or vapor initially present in said liquid which is to be separated from said liquid.

12. The method of claim 10 wherein said stripping gas or vapor injection position is at least 0.1 pipe diameters upstream of said venturi throat or upstream of the smallest diameter opening of said venturi configuration.

13. The method of claim 12 wherein said stripping gas or vapor injection position ranges from about 0.2 to about 25 pipe diameters upstream of said venturi throat or upstream of the smallest diameter opening of said venturi configuration.

14. The method of claim 12 wherein said injection position is within said venturi configuration compression cone.

15. The method of claim 12 wherein said venturi configuration throat length is the minimal length which can be reasonably fabricated.

16. The method of claim 1 wherein said stripping gas or vapor is initially contacted with said liquid by injecting said stripping gas or vapor into said liquid at an average linear velocity which is supersonic for said stripping gas or vapor.

17. The method of claim 1, claim 2, or claim 16 wherein said cocurrent flow is caused to be supersonic in said at least a portion of said flowing composition by passing said cocurrent flow through a flow accelerating device.

18. The method of claim 17 wherein said flow accelerating device comprises a minimum opening dimension as large as possible and still provide sufficient supersonic velocity in said at least a portion of said flowing composition to accomplish the desired fractional reduction in the gas or vapor initially present in said liquid which is to be separated from said liquid.

19. The method of claim 1, claim 2, or claim 16 wherein said stripping gas or vapor is also used to remove particulate matter from said liquid.

20. The method of claim 19 wherein said liquid is selected from the group consisting of aqueous solution, aqueous dispersion or suspension, organic substance, organic suspension or dispersion, and fluid metal or fluid metal alloy.

21. A method of separating at least one gas or vapor from a liquid, said method comprising:
   (a) contacting said liquid with a stripping gas or vapor which is immiscible in or which has low solubility in said liquid under operating conditions, said stripping gas or vapor being different from said gas or vapor initially present in said liquid which is to be separated from said liquid, and wherein said stripping gas or vapor is injected into said liquid at a linear velocity which is supersonic for at least a portion of said stripping gas or vapor at the time of initial contact with said liquid; and
   (b) separating said stripping gas or liquid from said liquid, whereby at least a portion of said gas or vapor initially present in said liquid is removed from said liquid.

22. The method of claim 21 wherein said stripping gas or vapor is also used to remove particulate matter from said liquid.

23. The method of claim 22 wherein said liquid is selected from the group consisting of aqueous solution, aqueous dispersion or suspension, organic substance, organic suspension or dispersion, and fluid metal or fluid metal alloy.

24. The method of claim 21 wherein said stripping gas or vapor is injected into said liquid as said liquid flows through a pipeline.

25. The method of claim 24 wherein said liquid comprises a fluid metal or fluid metal alloy.

* * * * *

UNITED STATES PATENT AND TRADEMARK OFFICE
CERTIFICATE OF CORRECTION

PATENT NO. : 4,861,352

DATED : August 29, 1989

INVENTOR(S) : Alan T. Cheng

It is certified that error appears in the above-identified patent and that said Letters Patent is hereby corrected as shown below:

Column 10, line 1, insert --Fractional reduction means--

Column 21, line 44, after the word "said" delete "occurently" and substitute therefor --cocurrently--

Column 22, line 51, after the word "or" delete "liquid" and substitute therefor --vapor--

Signed and Sealed this

Twenty-sixth Day of November, 1991

Attest:

HARRY F. MANBECK, JR.

*Attesting Officer*     *Commissioner of Patents and Trademarks*